(12) United States Patent
Yoo et al.

(10) Patent No.: US 11,386,832 B1
(45) Date of Patent: Jul. 12, 2022

(54) TILED DISPLAY DEVICE HAVING A PLURALITY OF DISPLAY PANELS

(71) Applicant: Samsung Display Co., Ltd., Yongin-Si (KR)

(72) Inventors: Hyunseuk Yoo, Seoul (KR); Bonghyun You, Seoul (KR); Kyung-Woo Kim, Yongin-si (KR); Seokha Hong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/470,518

(22) Filed: Sep. 9, 2021

(30) Foreign Application Priority Data

Jan. 8, 2021 (KR) .......................... 10-2021-0002570

(51) Int. Cl.
*G09G 3/20* (2006.01)
*G06F 3/14* (2006.01)

(52) U.S. Cl.
CPC ......... *G09G 3/2096* (2013.01); *G06F 3/1446* (2013.01); *G09G 3/2007* (2013.01);
(Continued)

(58) Field of Classification Search
CPC ............... G09G 3/2007; G09G 3/2096; G09G 2300/026; G09G 2320/0233;
(Continued)

(56) References Cited

U.S. PATENT DOCUMENTS

| | | | | |
|---|---|---|---|---|
| 5,668,569 A | * | 9/1997 | Greene | G09F 9/3026 345/903 |
| 6,115,092 A | * | 9/2000 | Greene | G09G 3/20 345/903 |

(Continued)

FOREIGN PATENT DOCUMENTS

| | | |
|---|---|---|
| CN | 111989736 A | 11/2020 |
| JP | 2014219630 A | 11/2014 |

(Continued)

OTHER PUBLICATIONS

Extended European Search Report for Application No. 22150248.7-1207 dated May 27, 2022 enumerating the above listed references in the Extended European Search Report.

*Primary Examiner* — Gene W Lee
(74) *Attorney, Agent, or Firm* — Cantor Colburn LLP

(57) ABSTRACT

A tiled display device includes a plurality of display panels coupled to each other, where each of the plurality of display panels includes an edge region adjacent to a boundary line between the plurality of display panels, and a panel driver which multiplies input gray levels of input image data for the plurality of display panels by an adaptive gain, generates boundary compensated image data by adding boundary compensation gray levels to the input gray levels multiplied by the adaptive gain for the edge region, and drives the plurality of display panels based on the boundary compensated image data. The adaptive gain is gradually decreased over a plurality of frame periods in a case where a sum of each of the input gray levels for the edge region and a (Continued)

corresponding one of the boundary compensation gray levels exceeds a maximum gray level.

20 Claims, 14 Drawing Sheets

(52) U.S. Cl.
CPC ............... *G09G 2300/026* (2013.01); *G09G 2310/0232* (2013.01); *G09G 2320/0233* (2013.01); *G09G 2320/0686* (2013.01); *G09G 2360/04* (2013.01); *G09G 2360/16* (2013.01)

(58) Field of Classification Search
CPC ....... G09G 2320/0686; G09G 2360/04; G09G 2360/16; G06F 3/1446
See application file for complete search history.

(56) References Cited

U.S. PATENT DOCUMENTS

| | | | | |
|---|---|---|---|---|
| 6,181,392 | B1* | 1/2001 | Greene | G09G 3/20 348/383 |
| 6,184,952 | B1* | 2/2001 | Greene | G09G 3/20 348/383 |
| 6,184,953 | B1* | 2/2001 | Greene | G06F 3/147 345/903 |
| 6,188,454 | B1* | 2/2001 | Greene | G06F 3/147 345/611 |
| 6,271,825 | B1* | 8/2001 | Greene | H04N 9/12 345/694 |
| 7,995,002 | B2* | 8/2011 | Miller | H01L 27/3293 345/1.3 |
| 8,410,995 | B2* | 4/2013 | Perkins | G09F 9/3026 345/1.3 |
| 9,025,111 | B2* | 5/2015 | Teller | G06F 3/1446 349/1 |
| 9,047,039 | B2* | 6/2015 | Perkins | H04N 9/3147 |
| 9,053,648 | B1* | 6/2015 | Lee | G02B 27/027 |
| 9,146,400 | B1* | 9/2015 | Lee | G02B 3/0037 |
| 9,336,729 | B2* | 5/2016 | Jepsen | G06F 3/1446 |
| 9,411,552 | B2* | 8/2016 | Jepsen | G06F 3/1446 |
| 9,500,906 | B2* | 11/2016 | Jepsen | G09G 3/3426 |
| 10,255,020 | B1* | 4/2019 | Foster | G09F 9/33 |
| 10,430,142 | B2* | 10/2019 | Jung | G06F 3/1446 |
| 10,431,149 | B2* | 10/2019 | Hyeon | G09G 3/32 |
| 10,510,304 | B2* | 12/2019 | Dunn | G02F 1/133603 |
| 10,719,288 | B2* | 7/2020 | Jung | G06F 3/1446 |
| 10,871,933 | B2* | 12/2020 | Foster | G09G 3/30 |
| 10,885,875 | B2* | 1/2021 | Lin | G06F 3/1446 |
| 10,914,956 | B1* | 2/2021 | Trail | G02B 27/0093 |
| 10,928,635 | B1* | 2/2021 | Trail | G02B 6/0023 |
| 11,074,028 | B2* | 7/2021 | Noyelle | G09G 3/3208 |
| 2006/0114172 | A1* | 6/2006 | Shivji | G09F 9/3026 345/1.1 |
| 2008/0284675 | A1* | 11/2008 | Perkins | G06F 3/1446 345/1.3 |
| 2009/0073079 | A1* | 3/2009 | Miller | H01L 27/3293 345/1.3 |
| 2011/0148742 | A1* | 6/2011 | Perkins | G09F 9/3026 345/1.3 |
| 2012/0139974 | A1 | 6/2012 | Sakai et al. | |
| 2013/0181884 | A1* | 7/2013 | Perkins | G09F 9/3026 345/1.3 |
| 2013/0278872 | A1* | 10/2013 | Teller | G02B 3/0056 349/96 |
| 2013/0279012 | A1* | 10/2013 | Lee | G02B 27/1066 359/622 |
| 2015/0022424 | A1* | 1/2015 | Jepsen | G09F 9/3026 345/1.3 |
| 2015/0023051 | A1* | 1/2015 | Jepsen | G02B 6/0005 362/559 |
| 2016/0246118 | A1* | 8/2016 | Jepsen | G02F 1/13336 |
| 2017/0249890 | A1 | 8/2017 | Yoo et al. | |
| 2017/0286043 | A1* | 10/2017 | Norton | G02B 27/0101 |
| 2017/0290127 | A1 | 10/2017 | Shigezane et al. | |
| 2018/0040271 | A1* | 2/2018 | Jung | G09G 3/2007 |
| 2018/0047345 | A1* | 2/2018 | Dunn | G02F 1/133603 |
| 2018/0166007 | A1* | 6/2018 | Hyeon | G09G 3/3426 |
| 2019/0212965 | A1* | 7/2019 | Foster | G09F 9/33 |
| 2019/0304404 | A1* | 10/2019 | Lin | G02B 3/005 |
| 2019/0384561 | A1* | 12/2019 | Jung | G09G 3/32 |
| 2020/0193943 | A1* | 6/2020 | Iversen | G09G 5/42 |
| 2020/0225903 | A1* | 7/2020 | Cohen | G09G 5/12 |
| 2020/0226969 | A1 | 7/2020 | Jun et al. | |
| 2020/0226990 | A1* | 7/2020 | Jun | G09G 3/3688 |
| 2020/0241828 | A1* | 7/2020 | Noyelle | G09G 3/3208 |
| 2021/0043151 | A1 | 2/2021 | Nawata et al. | |

FOREIGN PATENT DOCUMENTS

| | | |
|---|---|---|
| KR | 100480148 B1 | 4/2005 |
| KR | 1020060072737 A | 6/2006 |
| KR | 1020080007251 A | 1/2008 |
| KR | 1020120135946 A | 12/2012 |
| KR | 1020130055257 A | 5/2013 |
| KR | 1020140127569 A | 11/2014 |
| KR | 1020160124360 A | 10/2016 |
| KR | 1020170026878 A | 3/2017 |
| KR | 1020170087088 A | 7/2017 |
| KR | 1020170101349 A | 9/2017 |
| KR | 1020180014333 A | 2/2018 |
| KR | 101850994 B1 | 4/2018 |
| KR | 1020190009022 A | 1/2019 |
| KR | 1020190038175 A | 4/2019 |
| KR | 102083299 B1 | 3/2020 |
| KR | 1020200079923 A | 7/2020 |
| KR | 1020200082348 A | 7/2020 |

* cited by examiner

TILED DISPLAY DEVICE HAVING A PLURALITY OF DISPLAY PANELS

This application claims priority to Korean Patent Application No. 10-2021-0002570, filed on Jan. 8, 2021, and all the benefits accruing therefrom under 35 U.S.C. § 119, the content of which in its entirety is herein incorporated by reference.

BACKGROUND

1. Field

Embodiments of the invention relate to a display device, and more particularly to a tiled display device including a plurality of display panels coupled to each other.

2. Description of the Related Art

To overcome a resolution limitation and a size limitation of a single display panel, a tiled display device implemented by coupling a plurality of display panels has been developed. In such a tiled display device, a boundary line (or a seam line) between the plurality of display panels may be viewed or perceived by a user. Accordingly, a tiled display device where a scattering lens is disposed on the boundary line to prevent the boundary line from being perceived has been developed.

SUMMARY

In a tiled display device where a scattering lens is disposed on a boundary line between a plurality of display panels therein to prevent the boundary line from being perceived, an image may be blurred in a region adjacent to the scattering lens, and an alignment error between the display panels may occur.

Embodiments of the invention provide a tiled display device capable of preventing a boundary line between a plurality of display panels from being perceived.

According to an embodiment, a tiled display device includes a plurality of display panels coupled to each other, where each of the plurality of display panels includes an edge region adjacent to a boundary line between the plurality of display panels, and a panel driver which multiplies input gray levels of input image data for the plurality of display panels by an adaptive gain, generates boundary compensated image data by adding boundary compensation gray levels to the input gray levels multiplied by the adaptive gain for the edge region, and drives the plurality of display panels based on the boundary compensated image data. In such an embodiment, the adaptive gain is gradually decreased over a plurality of frame periods in a case where a sum of each of the input gray levels for the edge region and a corresponding one of the boundary compensation gray levels exceeds a maximum gray level.

In an embodiment, the adaptive gain may have a value greater than 0 and less than or equal to 1.

In an embodiment, the adaptive gain may have a single value with respect to an entire region of the plurality of display panels.

In an embodiment, the adaptive gain after the plurality of frame periods may be gradually decreased along a direction from a center region of each of the plurality of display panels to the edge region.

In an embodiment, the adaptive gain with respect to a center region of each of the plurality of display panels may be decreased by a first amount over the plurality of frame periods, and the adaptive gain with respect to the edge region of each of the plurality of display panels may be decreased by a second amount greater than the first amount over the plurality of frame periods.

In an embodiment, the panel driver may include an adaptive gain control block which multiplies the input gray levels for the plurality of display panels by the adaptive gain, and an edge region boosting block which generates the boundary compensated image data by adding the boundary compensation gray levels to the input gray levels multiplied by the adaptive gain for the edge region.

In an embodiment, in a case where the sum of each of the input gray levels for the edge region and the corresponding one of the boundary compensation gray levels is less than or equal to the maximum gray level, the adaptive gain control block may determine the adaptive gain as 1. In such an embodiment, in a case where the sum of each of the input gray levels for the edge region and the corresponding one of the boundary compensation gray levels is greater than the maximum gray level, the adaptive gain control block may determine a target gain in a way such that sums of the input gray levels multiplied by the target gain and the boundary compensation gray levels are less than or equal to the maximum gray level, and may gradually decrease the adaptive gain to the target gain over the plurality of frame periods.

In an embodiment, the adaptive gain control block may count a number of pixels in the edge region for which the sum of the input gray level and the boundary compensation gray level exceeds the maximum gray level. In a case where the counted number is less than a reference number, the adaptive gain control block may determine the adaptive gain as 1. In such an embodiment, in a case where the counted number is greater than or equal to the reference number, the adaptive gain control block may determine a target gain in a way such that sums of the input gray levels multiplied by the target gain and the boundary compensation gray levels are less than or equal to the maximum gray level, and may gradually decrease the adaptive gain to the target gain over the plurality of frame periods.

In an embodiment, the adaptive gain control block may count a number of pixels in the edge region for which the sum of the input gray level and the boundary compensation gray level exceeds the maximum gray level, and may calculate a ratio of the counted number to a total pixel number in the edge region. In a case where the calculated ratio is less than a reference ratio, the adaptive gain control block may determine the adaptive gain as 1. In such an embodiment, in a case where the calculated ratio is greater than or equal to the reference ratio, the adaptive gain control block may determine a target gain s in a way such that sums of the input gray levels multiplied by the target gain and the boundary compensation gray levels are less than or equal to the maximum gray level, and may gradually decrease the adaptive gain to the target gain over the plurality of frame periods.

In an embodiment, the adaptive gain control block may determine sums of the input gray levels for the edge region and the boundary compensation gray levels exceeding the maximum gray level, and may calculate differences between the sums exceeding the maximum gray level and the maximum gray level. In a case where a sum of the differences is less than a reference value, the adaptive gain control block may determine the adaptive gain as 1. In such an embodiment, in a case where the sum of the differences is greater than or equal to the reference value, the adaptive gain control block may determine a target gain in a way such that sums of the input gray levels multiplied by the target gain and the boundary compensation gray levels are less than or equal to the maximum gray level, and may gradually decrease the adaptive gain to the target gain over the plurality of frame periods.

In an embodiment, the panel driver may further include a compensation gray lookup table which stores the boundary compensation gray levels corresponding to respective gray levels. In such an embodiment, the edge region boosting block may determine the boundary compensation gray levels corresponding to the input gray levels multiplied by the adaptive gain by using the compensation gray lookup table, and may generate the boundary compensated image data by adding the boundary compensation gray levels to the input gray levels multiplied by the adaptive gain for the edge region.

In an embodiment, the panel driver may further include a compensation data memory which stores mura compensation data, and a mura compensating block which corrects the boundary compensated image data based on the mura compensation data.

In an embodiment, the panel driver may receive test data from a test device, may add the boundary compensation gray levels to the test data for the edge region, and may drive the plurality of display panels based on the test data to which the boundary compensation gray levels are added. In such an embodiment, the mura compensation data may be generated by capturing an image displayed by the plurality of display panels based on the test data to which the boundary compensation gray levels are added.

According to an embodiment, a tiled display device includes a plurality of display panels coupled to each other, where each of the plurality of display panels includes an edge region adjacent to a boundary line between the plurality of display panels, a data driver which provides data signals to the plurality of display panels, a gate driver which provides gate signals to the plurality of display panels, and a controller which controls the data driver and the gate driver. In such an embodiment, the controller includes an adaptive gain control block which multiplies input gray levels of input image data for the plurality of display panels by an adaptive gain, and an edge region boosting block which generates boundary compensated image data by adding boundary compensation gray levels to the input gray levels multiplied by the adaptive gain for the edge region, and provides the boundary compensated image data to the data driver. In such an embodiment, the adaptive gain is gradually decreased over a plurality of frame periods in a case where a sum of each of the input gray levels for the edge region and a corresponding one of the boundary compensation gray levels exceeds a maximum gray level.

In an embodiment, the adaptive gain may have a single value with respect to an entire region of the plurality of display panels.

In an embodiment, the adaptive gain after the plurality of frame periods may be gradually decreased along a direction from a center region of each of the plurality of display panels to the edge region.

In an embodiment, the adaptive gain with respect to a center region of each of the plurality of display panels may be decreased by a first amount over the plurality of frame periods, and the adaptive gain with respect to the edge region of each of the plurality of display panels may be decreased by a second amount greater than the first amount over the plurality of frame periods.

In an embodiment, the controller may further include a compensation gray lookup table which stores the boundary compensation gray levels corresponding to respective gray levels. In such an embodiment, the edge region boosting block may determine the boundary compensation gray levels corresponding to the input gray levels multiplied by the adaptive gain by using the compensation gray lookup table, and may generate the boundary compensated image data by adding the boundary compensation gray levels to the input gray levels multiplied by the adaptive gain for the edge region.

According to an embodiment, a tiled display device includes a plurality of display panels coupled to each other, where each of the plurality of display panels includes an edge region adjacent to a boundary line between the plurality of display panels, a data driver which provides data signals to the plurality of display panels, a gate driver which provides gate signals to the plurality of display panels, a compensation data memory which stores mura compensation data, and a controller which control the data driver and the gate driver. In such an embodiment, the controller includes an adaptive gain control block which multiplies input gray levels of input image data for the plurality of display panels by an adaptive gain, an edge region boosting block which generates boundary compensated image data by adding boundary compensation gray levels to the input gray levels multiplied by the adaptive gain for the edge region, and a mura compensating block which corrects the boundary compensated image data based on the mura compensation data, and provides the boundary compensated image data corrected based on the mura compensation data to the data driver. In such an embodiment, the adaptive gain is gradually decreased over a plurality of frame periods in a case where a sum of each of the input gray levels for the edge region and a corresponding one of the boundary compensation gray levels exceeds a maximum gray level.

In an embodiment, the controller may receive test data from a test device, and may add the boundary compensation gray levels to the test data for the edge region. In such an embodiment, the mura compensation data may be generated by capturing an image displayed by the plurality of display panels based on the test data to which the boundary compensation gray levels are added.

In embodiments of the invention, As described herein, a tiled display device may multiply input gray levels of input image data for a plurality of display panels coupled to each other by an adaptive gain, may generate boundary compensated image data by adding boundary compensation gray levels to the input gray levels (multiplied by the adaptive gain) for an edge region adjacent to a boundary line between the plurality of display panels, and may drive the plurality of display panels based on the boundary compensated image data. In such embodiments, the adaptive gain may be gradually decreased over a plurality of frame periods in a case where a sum of each of the input gray levels for the edge region and a corresponding one of the boundary compensation gray levels exceeds a maximum gray level. Accordingly, in such embodiments of the tiled display device, the boundary line between the plurality of display panels may be effectively prevented from being perceived.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
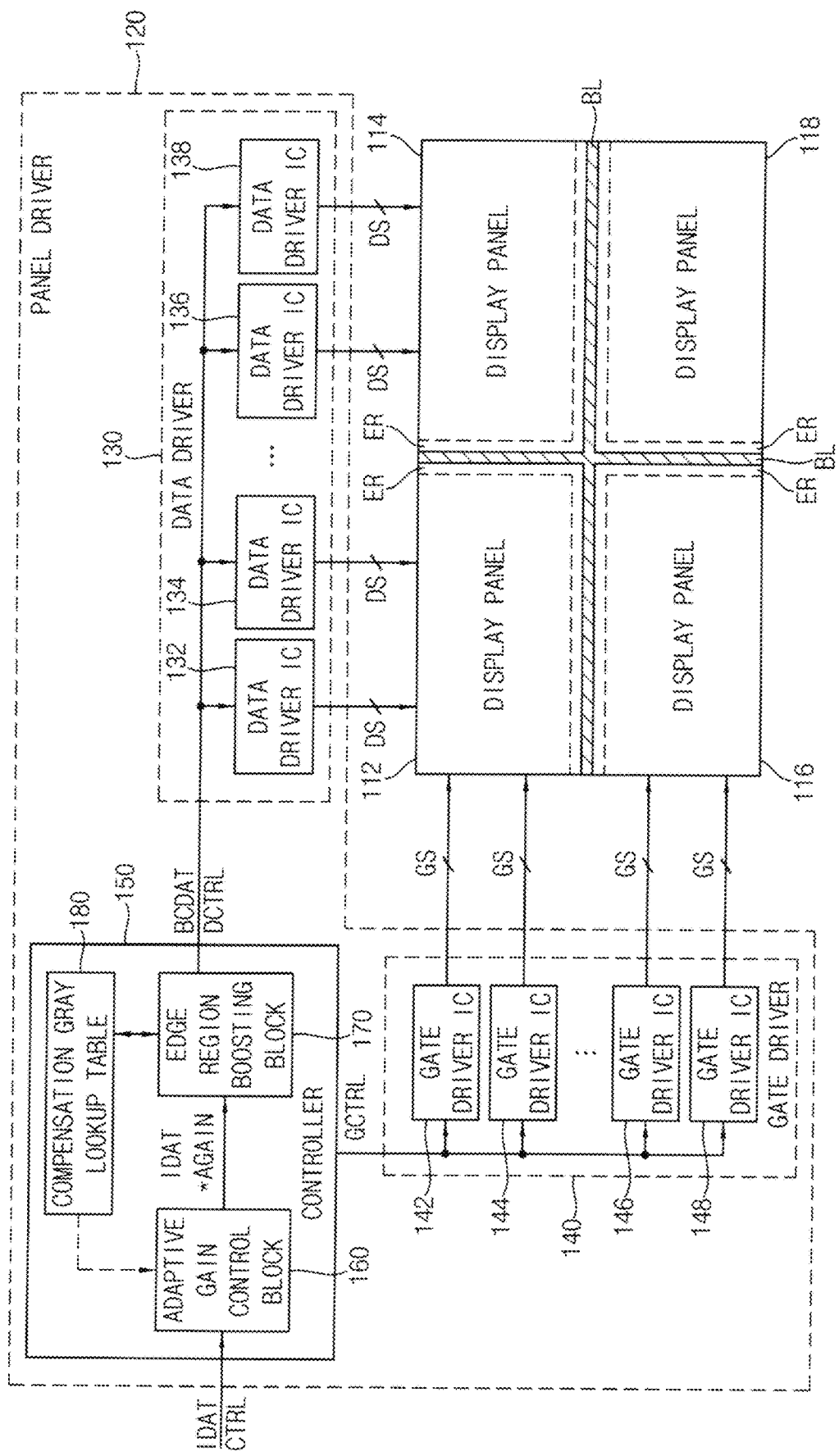
FIG. 1 is a block diagram illustrating a tiled display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments will be described in detail with reference to the accompanying drawings.

Figure 2:
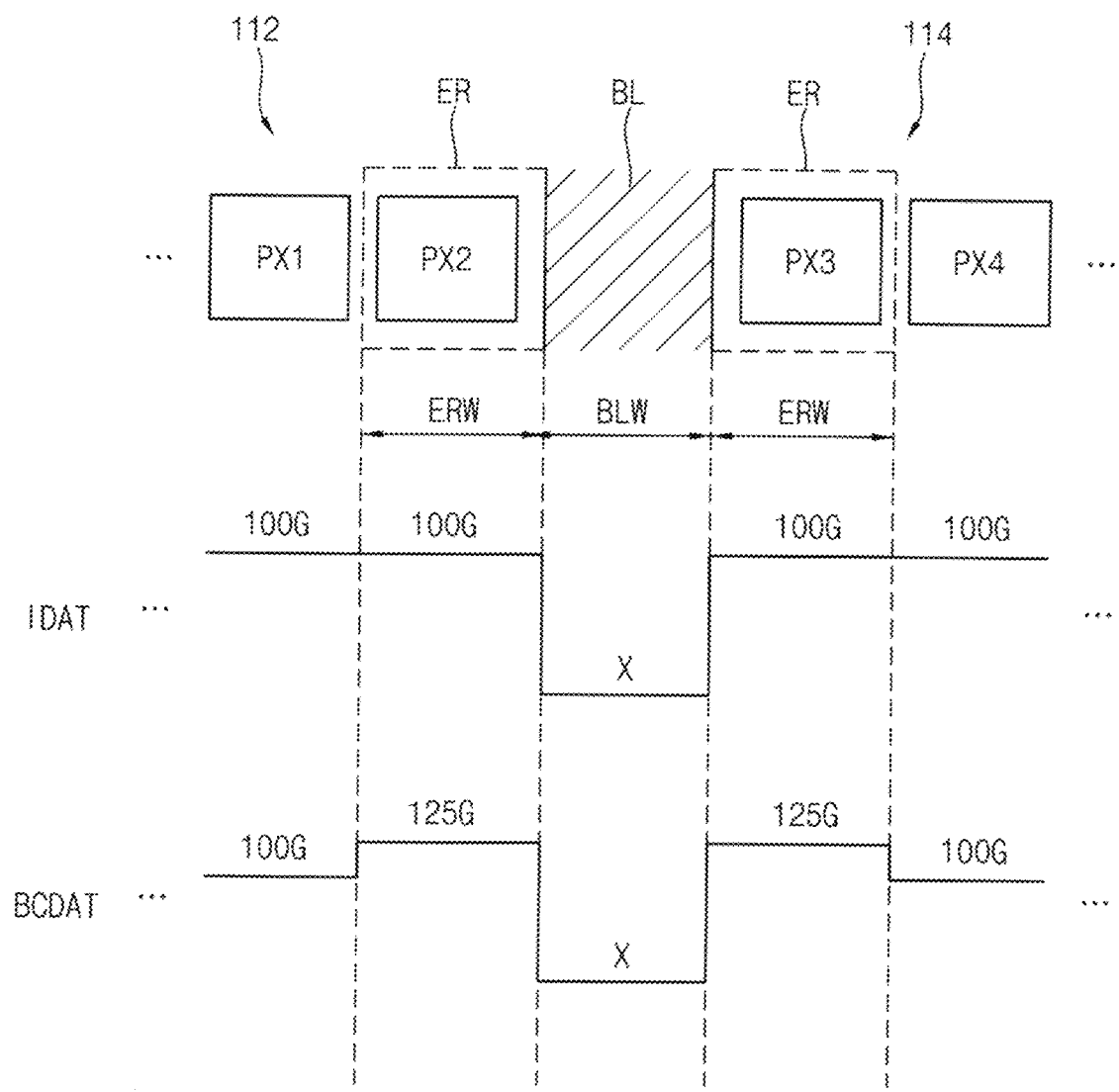
FIG. 2 is a diagram for describing an embodiment of an edge region boosting operation (or a seam side boosting operation) that increases input gray levels for an edge region.
Figure 3:
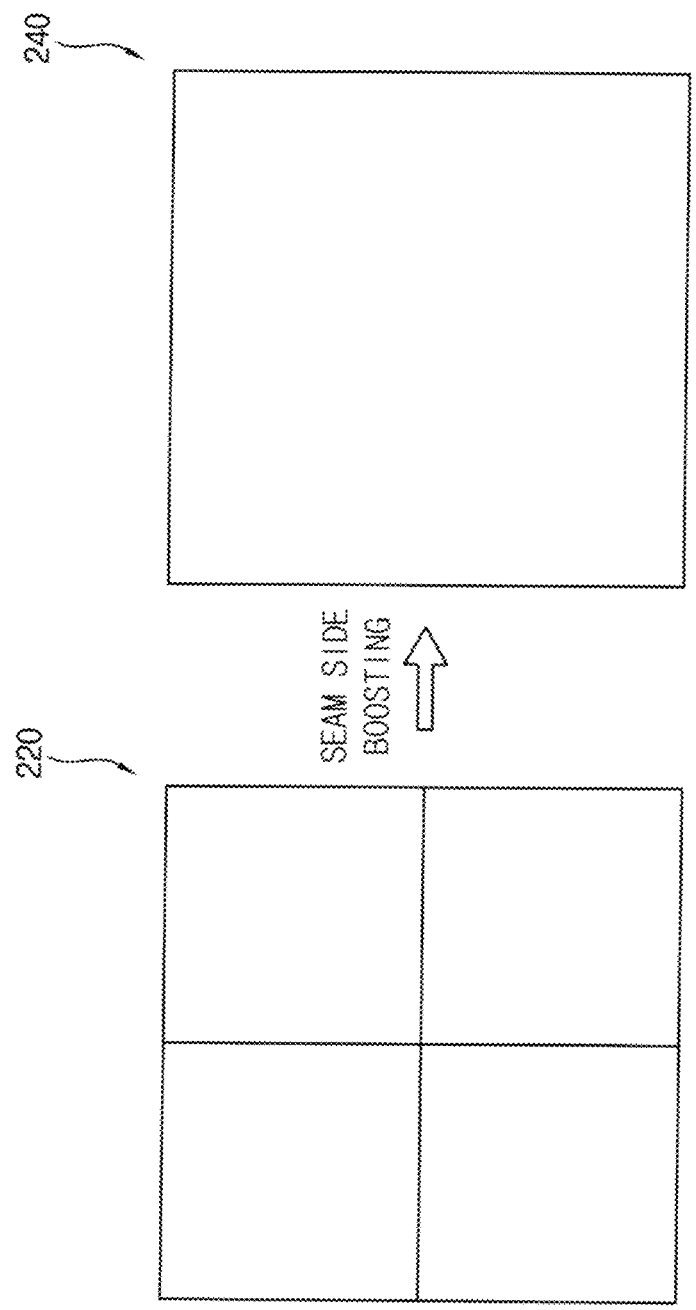
FIG. 3 is a diagram illustrating an embodiment of an image of a conventional tiled display device and an example of an image that is compensated by an edge region boosting operation (or a seam side boosting operation).
Figure 4:
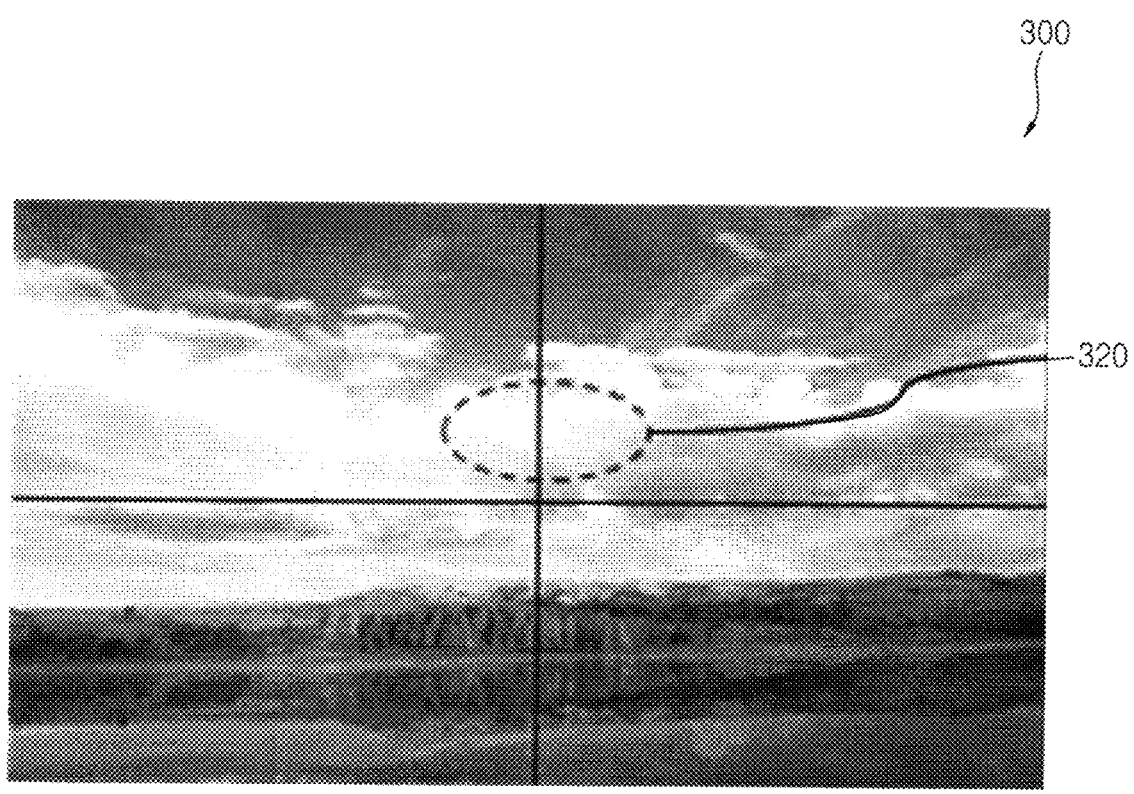
FIG. 4 is a diagram illustrating an embodiment of an image where a sum of an input gray level and a boundary compensation gray level exceeds a maximum gray level.
Figure 5:
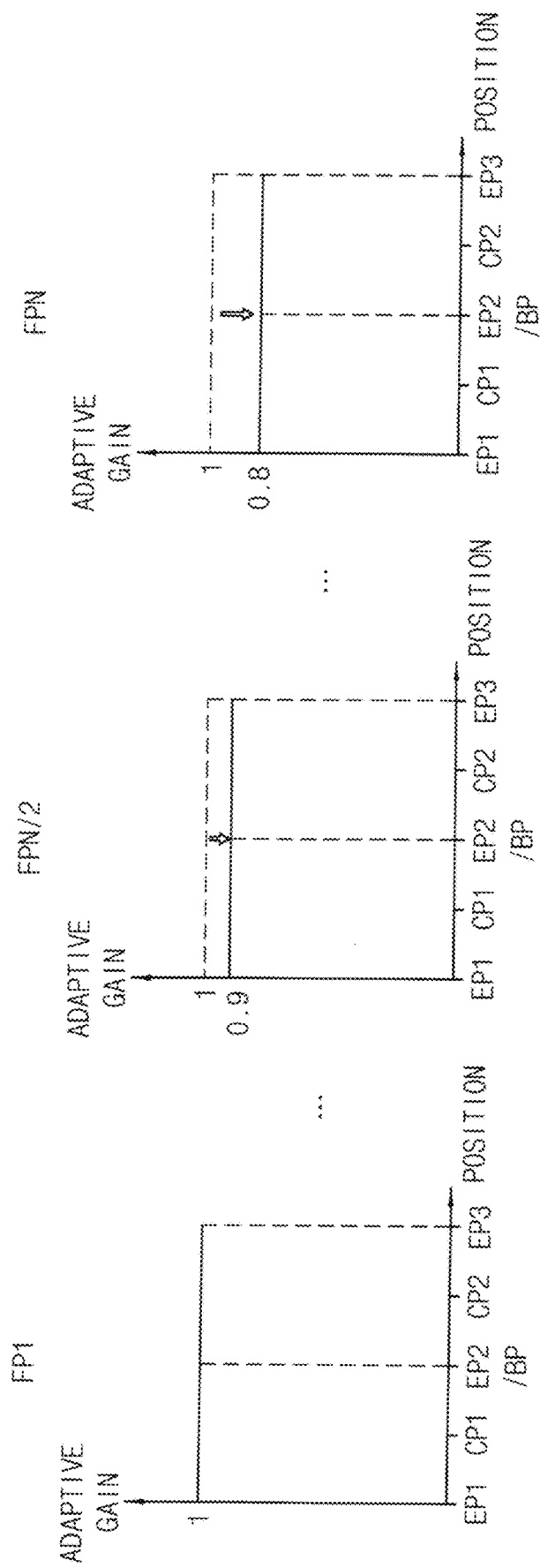
FIG. 5 is a diagram for describing an embodiment where an adaptive gain is gradually decreased over a plurality of frame periods in a tiled display device according to an embodiment.
Figure 6:
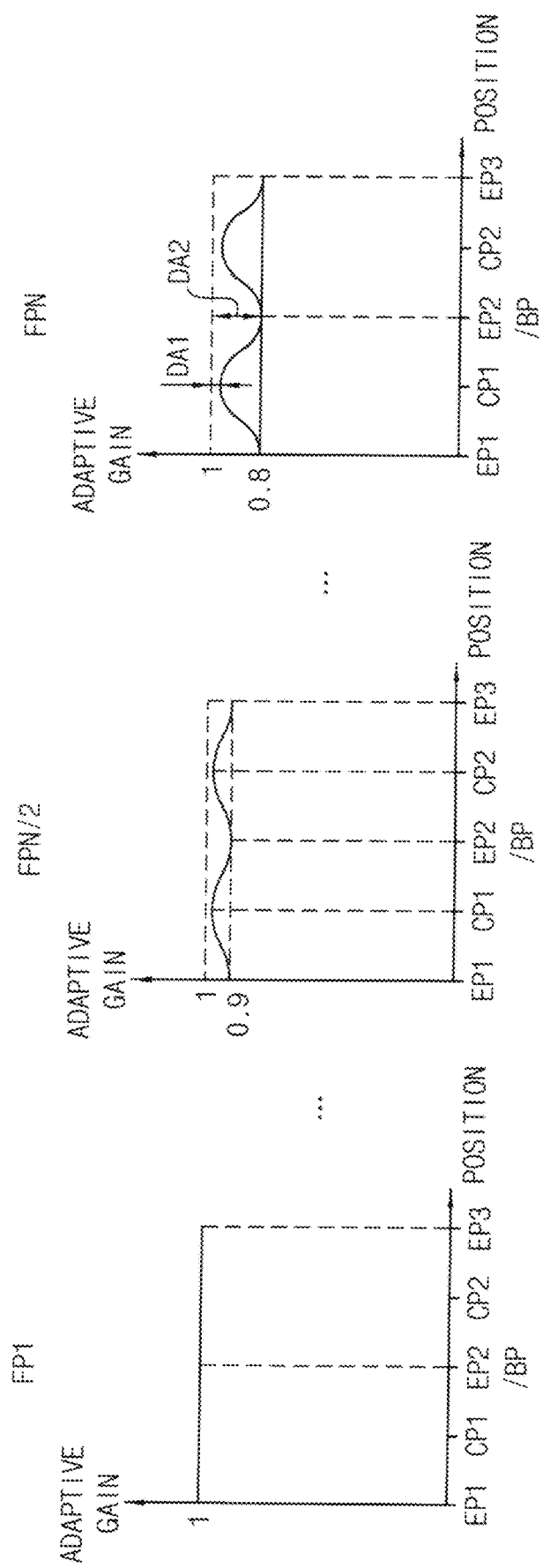
FIG. 6 is a diagram for describing an alternative embodiment where an adaptive gain is gradually decreased over a plurality of frame periods in a tiled display device according to an embodiment.

FIG. 1 is a block diagram illustrating a tiled display device according to an embodiment, FIG. 2 is a diagram for describing an embodiment of an edge region boosting operation (or a seam side boosting operation) that increases input gray levels for an edge region, FIG. 3 is a diagram illustrating an embodiment of an image of a conventional tiled display device and an embodiment of an image that is compensated by an edge region boosting operation (or a seam side boosting operation), FIG. 4 is a diagram illustrating an embodiment of an image where a sum of an input gray level and a boundary compensation gray level exceeds a maximum gray level, FIG. 5 is a diagram for describing an example where an adaptive gain is gradually decreased over a plurality of frame periods in a tiled display device according to an embodiment, and FIG. 6 is a diagram for describing an alternative embodiment where an adaptive gain is gradually decreased over a plurality of frame periods in a tiled display device according to an embodiment.

Referring to FIG. 1, an embodiment of a tiled display device 100 according to the invention may include a plurality of display panels 112, 114, 116 and 118 coupled to each other and a panel driver 120 that drives the plurality of display panels 112, 114, 116 and 118. In an embodiment, the panel driver 120 may include a data driver 130 that provides data signals DS to the plurality of display panels 112, 114, 116 and 118, a gate driver 140 that provides gate signals GS to the plurality of display panels 112, 114, 116 and 118, and a controller 150 that controls the data driver 130 and the gate driver 140.

The plurality of display panels 112, 114, 116 and 118 may be coupled, combined or attached to each other. In such an embodiment where the tiled display device 100 includes the plurality of display panels 112, 114, 116 and 118 coupled to each other, the tiled display device 100 may have a greater resolution and a larger size compared with a display device having a single display panel. FIG. 1 illustrates one embodiment where the tiled display device 100 includes 2×2 display panels 112, 114, 116 and 118, but not being limited thereto. In such an embodiment, the tiled display device 100 may include any number of two or more display panels 112, 114, 116 and 118.

In an embodiment, each display panel 112, 114, 116 and 118 may include a plurality of data lines, a plurality of gate lines, and a plurality of pixels coupled to the plurality of data lines and the plurality of gate lines. In an embodiment, each pixel may include a switching transistor, and a liquid crystal capacitor coupled to the switching transistor, and each display panel 112, 114, 116 and 118 may be a liquid crystal display ("LCD") panel. In an alternative embodiment, each pixel may include at least two transistors, at least one capacitor and a light emitting diode, such as an organic light emitting diode ("OLED"), and each display panel 112, 114, 116 and 118 may be a light emitting diode display panel, such as an OLED display panel. However, each display panel 112, 114, 116 and 118 is not limited to the LCD panel and the OLED display panel.

The data driver 130 may generate the data signals DS based on boundary compensated image data BCDAT and a data control signal DCTRL received from the controller 150, and may provide the data signals DS to the plurality of pixels through the plurality of data lines. In one embodiment, for example, the data control signal DCTRL may include, but not limited to, an output data enable signal, a data clock signal and a load signal. In an embodiment, as illustrated in FIG. 1, the data driver 130 may be implemented with (or defined by) one or more data driver integrated circuits ("ICs") 132, 134, 136 and 138. In an embodiment, the data driver ICs 132, 134, 136 and 138 may be mounted directly on the plurality of display panels 112, 114, 116 and 118 in a chip on glass ("COG") manner or a chip on plastic ("COP") manner, or may be mounted on a flexible film coupled to the plurality of display panels 112, 114, 116 and 118 in a chip on film ("COF") manner. In an alternative embodiment, the data driver 130 may be integrated in a peripheral portion of each display panel 112, 114, 116 and 118.

The gate driver 140 may generate the gate signals GS based on a gate control signal GCTRL received from the controller 150, and may sequentially provide the gate signals GS to the plurality of pixels on a row-by-row basis through the plurality of gate lines. In an embodiment, the gate control signal GCTRL may include, but not limited to, a gate start signal and a gate clock signal. In an embodiment, the gate driver 140 may be implemented with an amorphous silicon gate ("ASG") driver that is integrated in a peripheral portion of each display panel 112, 114, 116 and 118. In an embodiment, as illustrated in FIG. 1, the gate driver 140 may be implemented with one or more gate driver ICs 142, 144, 146 and 148. In an embodiments, the gate driver ICs 142, 144, 146 and 148 may be mounted directly on the plurality of display panels 112, 114, 116 and 118 in the COG manner or the COP manner, or may be mounted on a flexible film coupled to the plurality of display panels 112, 114, 116 and 118 in the COF manner.

The controller 150 (e.g., a timing controller) may receive input image data IDAT and a control signal CTRL from an external host processor (e.g., a graphic processing unit ("GPU"), an application processor ("AP"), or a graphic card). In an embodiment, the input image data IDAT may be RGB image data including red image data, green image data and blue image data. In an embodiment, the control signal CTRL may include, but not limited to, a vertical synchronization signal, a horizontal synchronization signal, an input data enable signal, a master clock signal, etc. In an embodiment, the controller 150 may generate the boundary compensated image data BCDAT by performing an edge region boosting operation (or a seam side boosting operation) on the input image data IDAT, and may generate the data control signal DCTRL and the gate control signal GCTRL based on the control signal CTRL. In such an embodiment, the controller 150 may control an operation of the data driver 130 by providing the data control signal DCTRL and the boundary compensated image data BCDAT to the data driver 130, and may control an operation of the gate driver 140 by providing the gate control signal GCTRL to the gate driver 140.

In an embodiment of the tiled display device 100 according the invention, a boundary line BL (or a seam line) may exist (or be defined) between the plurality of display panels 112, 114, 116 and 118. In the boundary line BL, no pixel may exist, and an image is not displayed. Thus, in such an embodiment of the tiled display device 100, the boundary line BL between the plurality of display panels 112, 114, 116 and 118 may be viewed or perceived by a user. In such an embodiment, the panel driver 120 of the tiled display device 100 may perform an edge region boosting operation that increases gray levels (hereinafter, referred to as input gray levels) of the input image data IDAT for an edge region ER adjacent to the boundary line BL in a display region of each display panel 112, 114, 116 and 118 where the plurality of pixels are disposed to prevent the boundary line BL from being perceived. In an embodiment, the boundary line BL may be referred to as a seam line, the edge region ER adjacent to the boundary line BL may be referred to as a seam side, and the edge region boosting operation may be referred to as a seam side boosting ("SSB") operation.

By the edge region boosting operation, the input gray levels for the edge region ER may be increased, and thus the boundary compensated image data BCDAT representing non-increased input gray levels for the display region other than the edge region ER and increased input gray levels for the edge region ER may be generated. In an embodiment, the panel driver 120 may add boundary compensation gray levels to the input gray levels for the edge region ER to perform the edge region boosting operation, and may generate the boundary compensated image data BCDAT representing the input gray levels to which boundary compensation gray levels are added for the edge region ER. In one embodiment, for example, as illustrated in FIG. 2, in a case where the input image data IDAT represent 100-gray levels 100G with respect to first and second pixels PX1 and PX2 of a first display panel 112 and third and fourth pixels PX3 and PX4 of a second display panel 114, the display panel 20 may perform the edge region boosting operation that adds the boundary compensation gray levels of 25-gray levels to the input gray levels of the second pixel PX2 in the edge region ER of the first display panel 112 and the third pixel PX3 in the edge region ER of the second display panel 114, and thus may generate the boundary compensated image data BCDAT representing the 100-gray levels 100G with respect to the first pixel PX1 of the first display panel 112 and the fourth pixel PX4 of the second display panel 114 and 125-gray levels 125G with respect to the second pixel PX2 of the first display panel 112 and the third pixel PX3 of the second display panel 114. FIG. 2 illustrates an embodiment where the edge region ER has a width ERW corresponding to a width or a length of one pixel, but the width ERW of the edge region ER of embodiments of the tiled display device 100 is not limited to the width or the length of one pixel. In one alternative embodiment, for example, the width ERW of the edge region ER may correspond to, but not limited to, a width or a length of two through ten pixels. FIG. 2 illustrates an embodiment where the boundary line BL has a width BLW corresponding to a width or a length of one pixel, but the width BLW of the boundary line BL of embodiments of the tiled display device 100 is not limited to the width or the length of one pixel. In one alternative embodiment, for example, the width BLW of the boundary line BL may be narrower than the width or the length of one pixel, or may be wider than the width or the length of one pixel.

In an image displayed based on the boundary compensated image data BCDAT generated by the edge region boosting operation (or the SSB operation), the boundary line BL between the plurality of display panels 112, 114, 116 and 118 may be effectively prevented or reduced from being perceived. As illustrated in FIG. 3, the boundary line BL between the plurality of display panels 112, 114, 116 and 118 may be perceived in an image 220 displayed based on the input image data IDAT on which the edge region boosting operation (or the SSB operation) is not performed. In an embodiment, the boundary line BL between the plurality of display panels 112, 114, 116 and 118 may be effectively prevented or reduced from being perceived in an image 240 displayed based on the boundary compensated image data BCDAT on which the edge region boosting operation (or the SSB operation) is performed.

In such an embodiment, since the edge region boosting operation increases the input gray levels for the edge region ER, in a case where the input image data IDAT for the edge region ER represent a maximum gray level (e.g., a 255-gray level) or the input gray levels close to the maximum gray level, the edge region boosting operation may not be effectively performed, and the boundary line BL between the plurality of display panels 112, 114, 116 and 118 may be perceived. As illustrated in FIG. 4, in a case where a portion 320 of an image 300 including the boundary line BL and the edge region ER is a high gray image (having a gray level greater than a reference gray level), or in a case where the input image data IDAT corresponding to the portion 320 of the image 300 represent the input gray levels close to the maximum gray level, the edge region boosting operation may not be effectively performed.

Accordingly, in an embodiment of the invention, the panel driver 120 of the tiled display device 100 may multiply the input gray levels of the input image data IDAT for the plurality of display panels 112, 114, 116 and 118 by an adaptive gain AGAIN, and may add the boundary compensation gray levels to the input gray levels multiplied by the adaptive gain AGAIN for the edge region ER. Thus, in such an embodiment, the panel driver 120 may generate the boundary compensated image data BCDAT representing the input gray levels multiplied by the adaptive gain AGAIN with respect to the display region other than the edge region ER of the plurality of display panels 112, 114, 116 and 118, and representing sums of the input gray levels multiplied by the adaptive gain AGAIN and the boundary compensation gray levels with respect to the edge region ER of the plurality of display panels 112, 114, 116 and 118. In an embodiment, the adaptive gain AGAIN may have a value greater than 0 and less than or equal to 1. In one embodiment, for example, when the adaptive gain AGAIN is 1, the input image data IDAT×AGAIN to which the adaptive gain AGAIN is applied may be substantially the same as the input image data IDAT to which the adaptive gain AGAIN is not applied. In such an embodiment, as the adaptive gain AGAIN decreases from 1, the input image data IDAT×AGAIN to which the adaptive gain AGAIN is applied may be decreased, and luminances of the plurality of display panels 112, 114, 116 and 118 may be decreased. However, in a case where the adaptive gain AGAIN is rapidly changed (e.g., decreased), a rapid luminance change (e.g., decrease) of an image of the plurality of display panels 112, 114, 116 and 118 may be perceived.

In an embodiment of the tiled display device 100 according to the invention, in a case where a sum of each input gray level for the edge region ER and the boundary compensation gray level exceeds the maximum gray level (e.g., the 255-gray level), the adaptive gain AGAIN may be gradually decreased over a plurality of frame periods to prevent such a rapid luminance change. Accordingly, the luminance of the image of the plurality of display panels 112, 114, 116 and 118 may be gradually decreased during a time period corresponding to the plurality of frame periods, and such a gradual luminance decrease may not be perceived by a user or a viewer. Such a gradual changing (or decreasing) of the adaptive gain AGAIN over the plurality of frame periods may be referred to as an adaptive gradual gain ("AGG") control operation. In an embodiment, the panel driver 120 (or the controller 150) of the tiled display device 100 may include an adaptive gain control block 160 and an edge region boosting block 170 to perform the AGG control operation and the SSB operation.

In an embodiment, the adaptive gain control block 160 may multiply the input gray levels of the input image data IDAT for the plurality of display panels 112, 114, 116 and 118 by the adaptive gain AGAIN. In such an embodiment, in a case where the sum of each input gray level for the edge region ER and the boundary compensation gray level exceeds the maximum gray level, the adaptive gain control block 160 may gradually decrease the adaptive gain AGAIN over the plurality of frame periods. In an embodiment, the controller 150 may further include a compensation gray lookup table 180 that stores the boundary compensation gray levels corresponding to respective (input) gray levels. In an embodiment, the adaptive gain control block 160 may obtain the boundary compensation gray level corresponding to the input gray level from the compensation gray lookup table 180, may calculate a sum of the input gray level and the boundary compensation gray level, and may selectively decrease the adaptive gain AGAIN based on whether the sum of the input gray level and the boundary compensation gray level exceeds the maximum gray level.

In an embodiment, the adaptive gain control block 160 may gradually decrease the adaptive gain AGAIN in a case where a sum of the input gray level for any one pixel in the edge region ER and the boundary compensation gray level exceeds the maximum gray level. In an alternative embodiment, the adaptive gain control block 160 may selectively gradually decrease the adaptive gain AGAIN based on the number (or a ratio) of pixels in the edge region ER for which the sum of the input gray level and the boundary compensation gray level exceeds the maximum gray level. In another alternative embodiment, the adaptive gain control block 160 may selectively gradually decrease the adaptive gain AGAIN based on the number of the pixels in the edge region ER for which the sum exceeds the maximum gray level and a difference between the sum and the maximum gray level.

In an embodiment, in a case where the sum of each of the input gray levels for all the pixels in the edge region ER and the boundary compensation gray level is less than or equal to the maximum gray level, the adaptive gain control block 160 may determine the adaptive gain AGAIN as 1. In such an embodiment, in a case where the sum of the input gray level for any one pixel in the edge region ER and the boundary compensation gray level exceeds the maximum gray level, the adaptive gain control block 160 may gradually decrease the adaptive gain AGAIN over the plurality of frame periods. In one embodiment, for example, the adaptive gain control block 160 may determine a target gain in a way such that sums of the input gray levels multiplied by the target gain and the boundary compensation gray levels are less than or equal to the maximum gray level, and may gradually decrease the adaptive gain AGAIN to the target gain over the plurality of frame periods. In an embodiment, the adaptive gain control block 160 may multiply the input gray levels of the input image data IDAT for the plurality of display panels 112, 114, 116 and 118 by the adaptive gain AGAIN.

In an alternative embodiment, the adaptive gain control block 160 may count the number of pixels in the edge region ER for which the sum of the input gray level and the boundary compensation gray level exceeds the maximum gray level, and may determine the adaptive gain AGAIN as 1 in a case where the counted number is less than a reference number. In such an embodiment, in a case where the counted number is greater than or equal to the reference number, the adaptive gain control block 160 may determine the target gain in a way such that the sums of the input gray levels multiplied by the target gain and the boundary compensation gray levels are less than or equal to the maximum gray level, and may gradually decrease the adaptive gain AGAIN to the target gain over the plurality of frame periods. In such an embodiment, the adaptive gain control block 160 may multiply the input gray levels of the input image data IDAT for the plurality of display panels 112, 114, 116 and 118 by the adaptive gain AGAIN.

In another alternative embodiment, the adaptive gain control block 160 may count the number of pixels in the edge region ER for which the sum of the input gray level and the boundary compensation gray level exceeds the maximum gray level, may calculate a ratio of the counted number to a total pixel number in the edge region ER, and may determine the adaptive gain AGAIN as 1 in a case where the calculated ratio is less than a reference ratio. In such an embodiment, in a case where the calculated ratio is greater than or equal to the reference ratio, the adaptive gain control block 160 may determine the target gain in a way such that the sums of the input gray levels multiplied by the target gain and the boundary compensation gray levels are less than or equal to the maximum gray level, and may gradually decrease the adaptive gain AGAIN to the target gain over the plurality of frame periods. In such an embodiment, the adaptive gain control block 160 may multiply the input gray levels of the input image data IDAT for the plurality of display panels 112, 114, 116 and 118 by the adaptive gain AGAIN.

In still another alternative embodiment, the adaptive gain control block 160 may determine sums of the input gray levels for the edge region ER and the boundary compensation gray levels exceeding the maximum gray level, may calculate differences between the sums exceeding the maximum gray level and the maximum gray level, and may determines the adaptive gain AGAIN as 1 in a case where a sum of the differences is less than a reference value. In such an embodiment, in a case where the sum of the differences is greater than or equal to the reference value, the adaptive gain control block 160 may determine the target gain in a way such that sums of the input gray levels multiplied by the target gain and the boundary compensation gray levels are less than or equal to the maximum gray level, and may gradually decrease the adaptive gain AGAIN to the target gain over the plurality of frame periods. In such an embodiment, the adaptive gain control block 160 may multiply the input gray levels of the input image data IDAT for the plurality of display panels 112, 114, 116 and 118 by the adaptive gain AGAIN.

In an embodiment, the adaptive gain AGAIN may have a single value or a same value with respect to the entire region of the plurality of display panels 112, 114, 116 and 118. Thus, the adaptive gain control block 160 may gradually decrease the adaptive gain AGAIN over the plurality of frame periods by a same amount with respect to the entire region of the plurality of display panels 112, 114, 116 and 118. FIG. 5 illustrates an embodiment where the adaptive gain AGAIN is gradually decreased over the plurality of frame periods. In FIG. 5 (and FIG. 6), EP1 may represent a position of the edge region ER of the first display panel 112 at a side distant from the second display panel 114, CP1 may represent a position of a center region of the first display panel 112, EP2/BP may represent a position of the edge region ER of the first display panel 112 at a side close to the second display panel 114, a position of the boundary line BL, or a position of the edge region ER of the second display panel 114 at a side close to the first display panel 112, CP2 may represent a position of a center region of the second display panel 114, and EP3 may represent a position of the edge region ER of the second display panel 114 at a side distant from the first display panel 112. In one embodiment, for example, as illustrated in FIG. 5, the adaptive gain AGAIN may be gradually decreased over N frame periods FP1, ..., FPN/2, ..., and FPN by a same amount with respect to the entire region of the plurality of display panels 112, 114, 116 and 118, where N is an integer greater than 1. In an embodiment, where a driving frequency of the plurality of display panels 112, 114, 116 and 118 is about 120 hertz (Hz), and the target gain is about 0.8, to gradually decrease the adaptive gain AGAIN for about 10 seconds, the adaptive gain control block 160 may gradually decrease the adaptive gain AGAIN from about 1 to about 0.8 over 1,200 frame periods FP1, ..., FPN/2, ..., and FPN. In such an embodiment, the adaptive gain AGAIN may have a same value of about 0.9 with respect to the entire region of the plurality of display panels 112, 114, 116 and 118 in a 600-th frame period FPN/2, and may have a same value of about 0.8 with respect to the entire region of the plurality of display panels 112, 114, 116 and 118 in a 1,200-th frame period FPN.

In an alternative embodiment, the adaptive gain AGAIN after the plurality of frame periods may be gradually decreased along a direction or as being away from a center region of each display panel 112, 114, 116 and 118 to the edge region ER. FIG. 6 illustrates an embodiment of the adaptive gain AGAIN for one pixel row of the first and second display panels 112 and 114. In one embodiment, for example, as illustrated in FIG. 6, the adaptive gain AGAIN may be decreased by a first amount DA1 over N frame periods FP1, ..., FPN/2, ..., and FPN at a position CP1 and CP2 of the center region of each display panel 112 and 114, and may be decreased by a second amount DA2 greater than the first amount DA1 over the N frame periods FP1, ..., FPN/2, ..., and FPN at a position EP1, EP2/BP and EP3 of the edge region ER of each display panel 112 and 114. In an embodiment, where a driving frequency of the plurality of display panels 112, 114, 116 and 118 is about 120 Hz, and the target gain is about 0.8, to gradually decrease the adaptive gain AGAIN for about 10 seconds, the adaptive gain control block 160 may gradually decrease the adaptive gain AGAIN by the second amount DA2 of about 0.2 over 1,200 frame periods FP1, ..., FPN/2, ..., and FPN at the position EP1, EP2/BP and EP3 of the edge region ER of each display panel 112 and 114, and may gradually decrease the adaptive gain AGAIN by the first amount DA1 less than the second amount DA2 of about 0.2 over the 1,200 frame periods FP1, ..., FPN/2, ..., and FPN at the position CP1 and CP2 of the center region of each display panel 112 and 114.

The edge region boosting block 170 may receive the input image data IDAT×AGAIN multiplied by the adaptive gain AGAIN from the adaptive gain control block 160, may generate the boundary compensated image data BCDAT by performing the edge region boosting operation that adds the boundary compensation gray levels to the input gray levels of the input image data IDAT×AGAIN multiplied by the adaptive gain AGAIN for the edge region ER, and may provide the boundary compensated image data BCDAT to the data driver 130. The data driver 130 may drive the plurality of display panels 112, 114, 116 and 118 based on the boundary compensated image data BCDAT.

In an embodiment, as shown in FIG. 1, the controller 150 may further include a compensation gray lookup table 180 that stores the boundary compensation gray levels corresponding to respective (input) gray levels. According to an embodiment, values of the boundary compensation gray levels may be determined based on, but not limited to, a width of the boundary line BL, a pixel pitch of each display panel 112, 114, 116 and 118, etc. In an embodiment, the edge region boosting block 170 may determine the boundary compensation gray levels corresponding to the input gray levels multiplied by the adaptive gain AGAIN by using the compensation gray lookup table 180, and may generate the boundary compensated image data BCDAT by adding the boundary compensation gray levels to the input gray levels multiplied by the adaptive gain AGAIN for the edge region ER.

In an embodiment, as described above, the tiled display device 100 may multiply the input gray levels of the input image data IDAT for the plurality of display panels 112, 114, 116 and 118 coupled to each other by the adaptive gain AGAIN, may generate the boundary compensated image data BCDAT by adding the boundary compensation gray levels to the input gray levels (multiplied by the adaptive gain AGAIN) for the edge region ER adjacent to the boundary line BL between the plurality of display panels 112, 114, 116 and 118, and may drive the plurality of display panels 112, 114, 116 and 118 based on the boundary compensated image data BCDAT. Accordingly, in such an embodiment of the tiled display device 100, the boundary line BL between the plurality of display panels 112, 114, 116 and 118 may be effectively prevented or reduced from being perceived. Further, in such an embodiment of the tiled display device 100, the adaptive gain AGAIN may be gradually decreased over the plurality of frame periods in a case where the sum of the input gray level for the edge region ER and the boundary compensation gray level exceeds the maximum gray level. Accordingly, even when a high gray image is displayed in the edge region ER, the edge region boosting operation may be performed while the luminance reduction caused by the adaptive gain AGAIN is not perceived.

Figure 7:
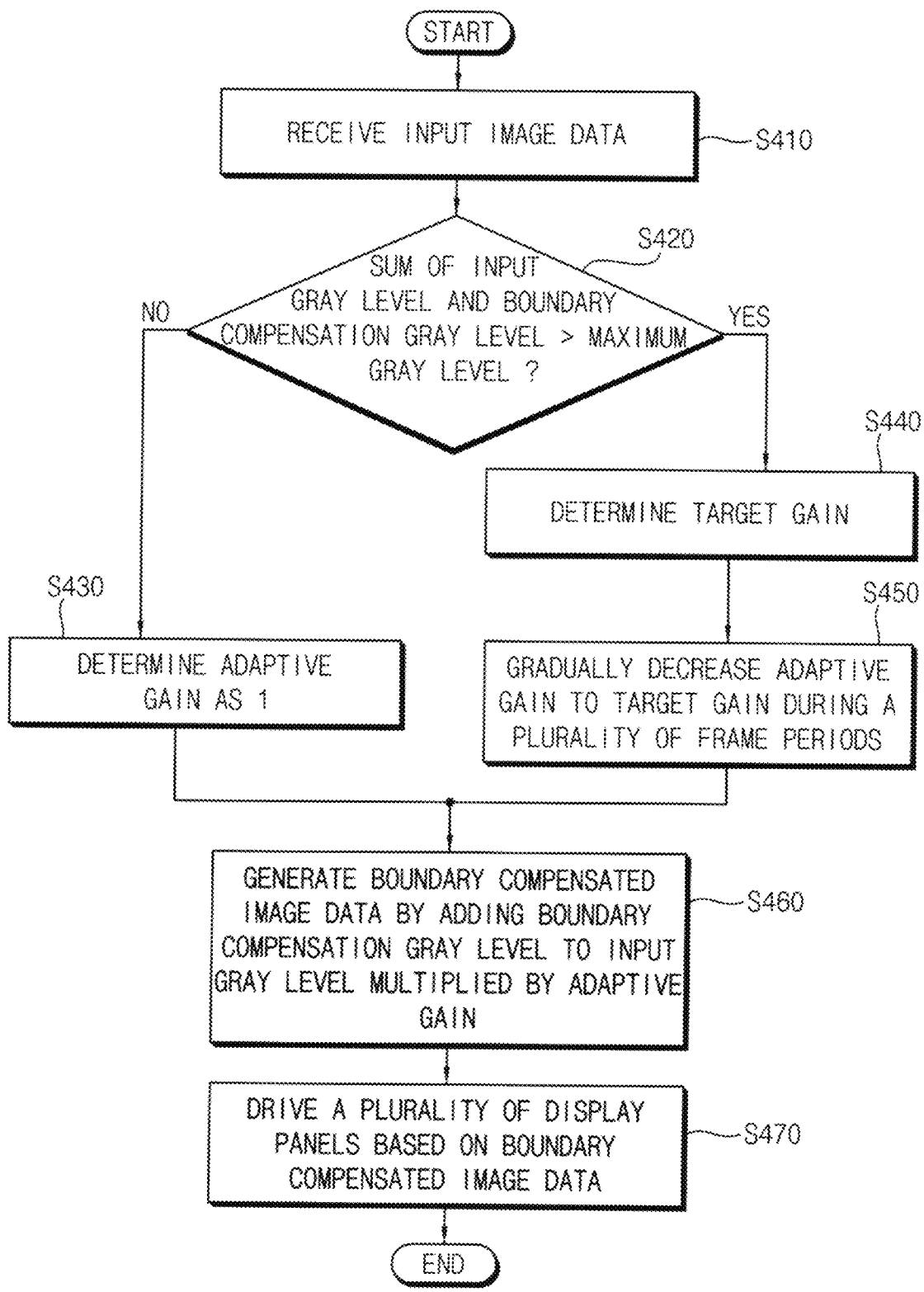
FIG. 7 is a flowchart illustrating a method of operating a tiled display device according to an embodiment.

FIG. 7 is a flowchart illustrating a method of operating a tiled display device according to an embodiment.

Referring to FIGS. 1 and 7, in an embodiment of a method of operating a tiled display device 100, a panel driver 120 may receive input image data IDAT (S410), and an adaptive gain control block 160 of the panel driver 120 may control an adaptive gain AGAIN based on whether a sum of an input gray level of the input image data IDAT and a boundary compensation gray level exceeds a maximum gray level (S420, S430, S440 and S450).

In a case where a sum of each of input gray levels for all pixels in an edge region ER and the boundary compensation gray level is less than or equal to the maximum gray level (S420: NO), the adaptive gain control block 160 may determine the adaptive gain AGAIN as 1 (S430).

In a case where the sum of the input gray level for any one pixel in the edge region ER and the boundary compensation gray level is greater than the maximum gray level (S420: YES), the adaptive gain control block 160 may gradually decrease the adaptive gain AGAIN over a plurality of frame periods (S440 and S450). In one embodiment, for example, the adaptive gain control block 160 may determine a target gain in a way such that sums of the input gray levels multiplied by the target gain and the boundary compensation gray levels are less than or equal to the maximum gray level (S440), and may gradually decrease the adaptive gain AGAIN to the target gain over the plurality of frame periods (S450).

The adaptive gain control block 160 may multiply the input gray levels of the input image data IDAT for a plurality of display panels 112, 114, 116 and 118 by the adaptive gain AGAIN, and an edge region boosting block 170 of the panel driver 120 may generate boundary compensated image data BCDAT by performing an edge region boosting operation that adds the boundary compensation gray levels to the input gray levels of the input image data IDAT×AGAIN multiplied by the adaptive gain AGAIN for the edge region ER (S460).

The edge region boosting block 170 may provide the boundary compensated image data BCDAT to a data driver 130, and the data driver 130 may drive the plurality of display panels 112, 114, 116 and 118 based on the boundary compensated image data BCDAT (S470). Accordingly, in such an embodiment of the tiled display device 100, a boundary line BL between the plurality of display panels 112, 114, 116 and 118 may be effectively prevented or reduced from being perceived. In such an embodiment, even when a high gray image is displayed in the edge region ER, the edge region boosting operation may be effectively performed while a luminance reduction caused by the adaptive gain AGAIN is not perceived.

Figure 8:
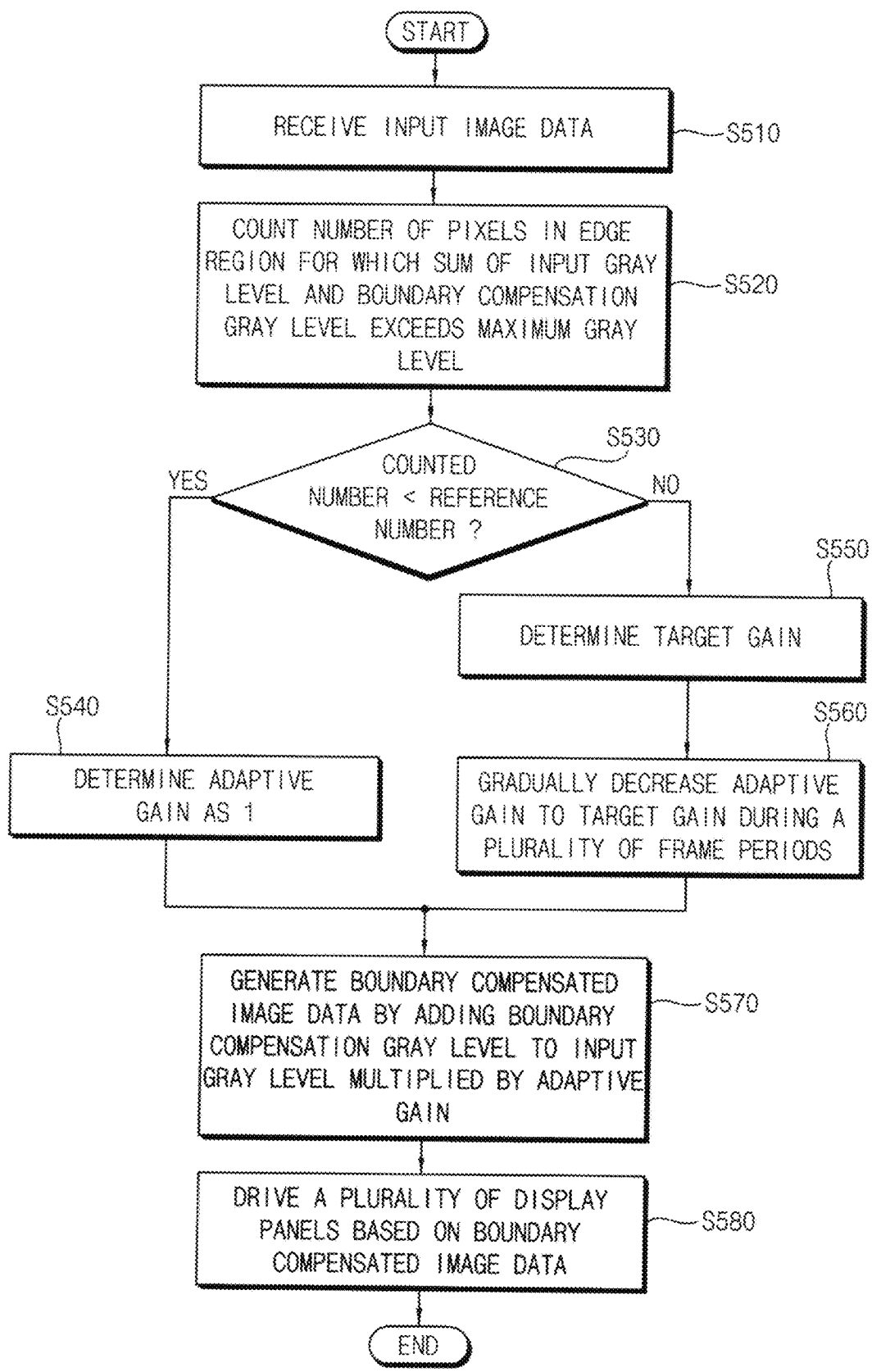
FIG. 8 is a flowchart illustrating a method of operating a tiled display device according to an alternative embodiment.

FIG. 8 is a flowchart illustrating a method of operating a tiled display device according to an alternative embodiment.

Referring to FIGS. 1 and 8, in an embodiment of a method of operating a tiled display device 100, a panel driver 120 may receive input image data IDAT (S510), and an adaptive gain control block 160 of the panel driver 120 may control an adaptive gain AGAIN based on the number of pixels in an edge region ER for which a sum of an input gray level of the input image data IDAT and a boundary compensation gray level exceeds a maximum gray level (S520, S530, S540, S550 and S560).

The adaptive gain control block 160 may count the number of pixels in the edge region ER for which the sum of the input gray level and the boundary compensation gray level exceeds the maximum gray level (S520). In a case where the counted number is less than a reference number (S530: YES), the adaptive gain control block 160 may determine the adaptive gain AGAIN as 1 (S540).

In a case where the counted number is greater than or equal to the reference number (S530: NO), the adaptive gain control block 160 may gradually decrease the adaptive gain AGAIN over a plurality of frame periods (S550 and S560). In one embodiment, for example, the adaptive gain control block 160 may determine a target gain in a way such that sums of the input gray levels multiplied by the target gain and the boundary compensation gray levels are less than or equal to the maximum gray level (S550), and may gradually decrease the adaptive gain AGAIN to the target gain over the plurality of frame periods (S560).

The adaptive gain control block 160 may multiply the input gray levels of the input image data IDAT for a plurality of display panels 112, 114, 116 and 118 by the adaptive gain AGAIN, and an edge region boosting block 170 of the panel driver 120 may generate boundary compensated image data BCDAT by performing an edge region boosting operation that adds the boundary compensation gray levels to the input gray levels of the input image data IDAT×AGAIN multiplied by the adaptive gain AGAIN for the edge region ER (S570).

The edge region boosting block 170 may provide the boundary compensated image data BCDAT to a data driver 130, and the data driver 130 may drive the plurality of display panels 112, 114, 116 and 118 based on the boundary compensated image data BCDAT (S580). Accordingly, in such an embodiment of the tiled display device 100, a boundary line BL between the plurality of display panels 112, 114, 116 and 118 may be effectively prevented or reduced from being perceived. In such an embodiment, even when a high gray image is displayed in the edge region ER, the edge region boosting operation may be effectively performed while a luminance reduction caused by the adaptive gain AGAIN is not perceived.

Figure 9:
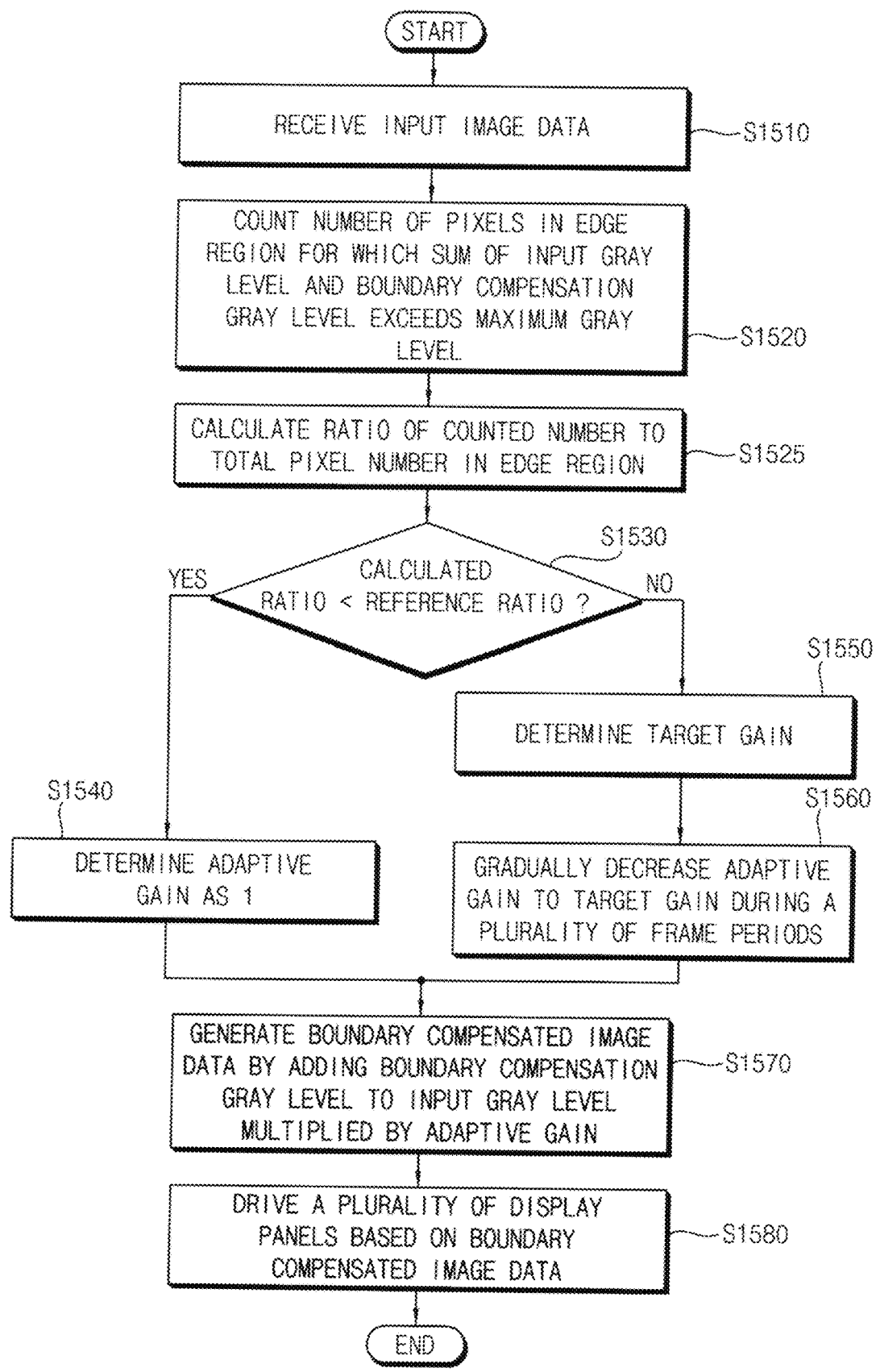
FIG. 9 is a flowchart illustrating a method of operating a tiled display device according to another alternative embodiment.

FIG. 9 is a flowchart illustrating a method of operating a tiled display device according to another alternative embodiment.

Referring to FIGS. 1 and 9, in an embodiment of a method of operating a tiled display device 100, a panel driver 120 may receive input image data IDAT (S1510), and an adaptive gain control block 160 of the panel driver 120 may control an adaptive gain AGAIN based on a ratio of the number of pixels in an edge region ER for which a sum of an input gray level and a boundary compensation gray level exceeds a maximum gray level to a total pixel number in the edge region ER (S1520, S1525, S1530, S1540, S1550 and S1560).

The adaptive gain control block 160 may count the number of pixels in the edge region ER for which the sum of the input gray level and the boundary compensation gray level exceeds the maximum gray level (S1520), and may calculate a ratio of the counted number to the total pixel number in the edge region ER (S1525). In a case where the calculated ratio is less than a reference ratio (S1530: YES), the adaptive gain control block 160 may determine the adaptive gain AGAIN as 1 (S1540).

In a case where the calculated ratio is greater than or equal to the reference ratio (S1530: NO), the adaptive gain control block 160 may determine a target gain in a way such that sums of the input gray levels multiplied by the target gain and the boundary compensation gray levels are less than or equal to the maximum gray level (S1550), and may gradually decrease the adaptive gain AGAIN to the target gain over a plurality of frame periods (S1560).

The adaptive gain control block 160 may multiply the input gray levels of the input image data IDAT for a plurality of display panels 112, 114, 116 and 118 by the adaptive gain AGAIN, and an edge region boosting block 170 of the panel driver 120 may generate boundary compensated image data BCDAT by performing an edge region boosting operation that adds the boundary compensation gray levels to the input gray levels of the input image data IDAT×AGAIN multiplied by the adaptive gain AGAIN for the edge region ER (S1570).

The edge region boosting block 170 may provide the boundary compensated image data BCDAT to a data driver 130, and the data driver 130 may drive the plurality of display panels 112, 114, 116 and 118 based on the boundary compensated image data BCDAT (S1580). Accordingly, in such an embodiment of the tiled display device 100, a boundary line BL between the plurality of display panels 112, 114, 116 and 118 may be effectively prevented or reduced from being perceived. In such an embodiment, even when a high gray image is displayed in the edge region ER, the edge region boosting operation may be effectively performed while a luminance reduction caused by the adaptive gain AGAIN is not perceived.

Figure 10:
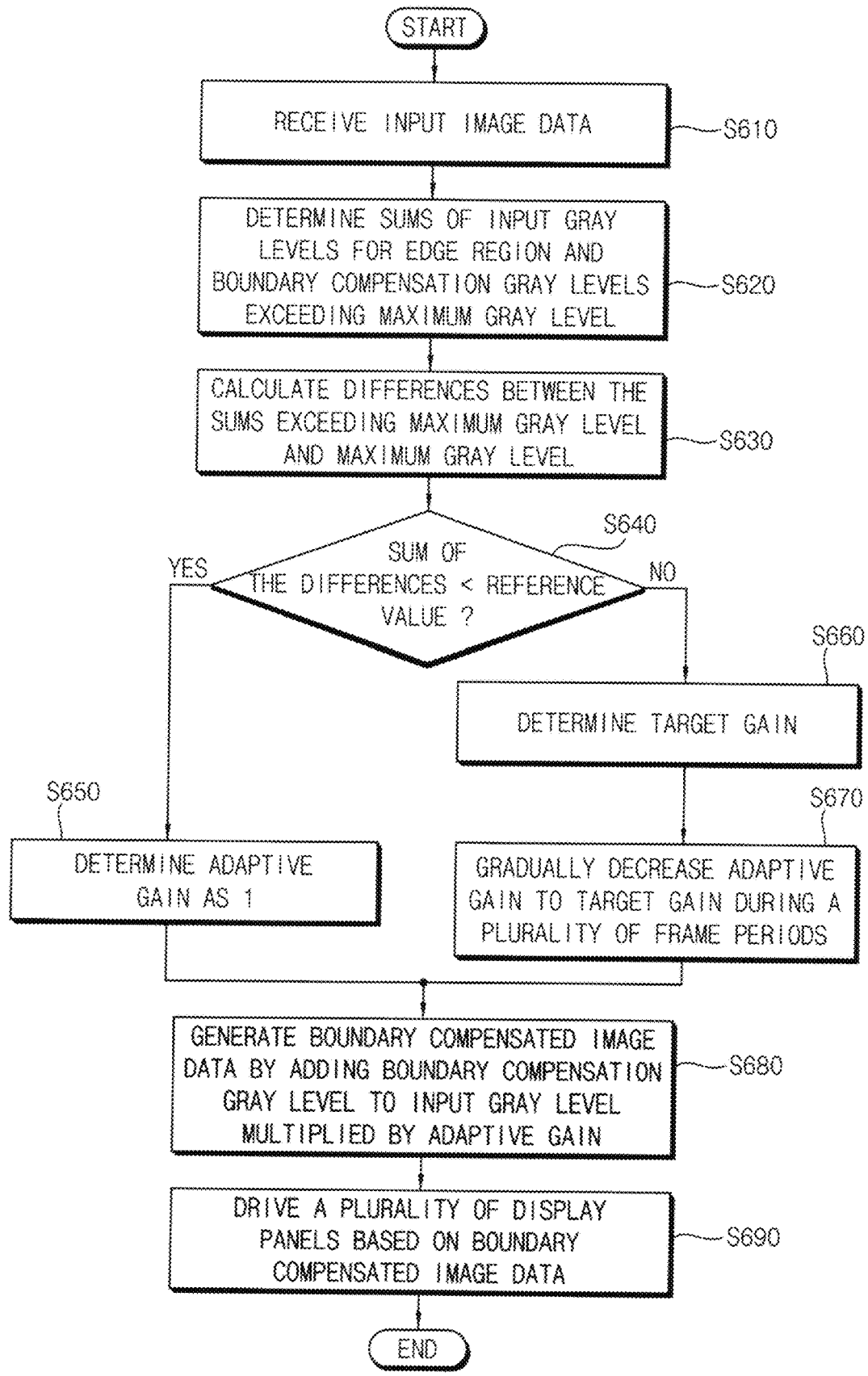
FIG. 10 is a flowchart illustrating a method of operating a tiled display device according to another alternative embodiment.

FIG. 10 is a flowchart illustrating a method of operating a tiled display device according to another alternative embodiment.

Referring to FIGS. 1 and 10, in an embodiment of a method of operating a tiled display device 100, a panel driver 120 may receive input image data IDAT (S610), and an adaptive gain control block 160 of the panel driver 120 may control an adaptive gain AGAIN based on the number of sums of input gray levels of the input image data IDAT for and edge region ER and boundary compensation gray levels exceeding a maximum gray level, and differences between the sums and the maximum gray level (S620, S630, S640, S650, S660 and S670).

The adaptive gain control block 160 may determine the sums of the input gray levels for the edge region ER and the boundary compensation gray levels exceeding the maximum gray level (S620), and may calculate the differences between the sums exceeding the maximum gray level and the maximum gray level (S630). In a case where a sum of the differences is less than a reference value (S640: YES), the adaptive gain control block 160 may determine the adaptive gain AGAIN as 1 (S650).

In a case where the sum of the differences is greater than or equal to the reference value (S640: NO), the adaptive gain control block 160 may gradually decrease the adaptive gain AGAIN over a plurality of frame periods (S660 and S670). In one embodiment, for example, the adaptive gain control block 160 may determine a target gain in a way such that sums of the input gray levels multiplied by the target gain and the boundary compensation gray levels are less than or equal to the maximum gray level (S660), and may gradually decrease the adaptive gain AGAIN to the target gain over the plurality of frame periods (S670).

The adaptive gain control block 160 may multiply the input gray levels of the input image data IDAT for a plurality of display panels 112, 114, 116 and 118 by the adaptive gain AGAIN, and an edge region boosting block 170 of the panel driver 120 may generate boundary compensated image data BCDAT by performing an edge region boosting operation that adds the boundary compensation gray levels to the input gray levels of the input image data IDAT×AGAIN multiplied by the adaptive gain AGAIN for the edge region ER (S680).

The edge region boosting block 170 may provide the boundary compensated image data BCDAT to a data driver 130, and the data driver 130 may drive the plurality of display panels 112, 114, 116 and 118 based on the boundary compensated image data BCDAT (S690). Accordingly, in such an embodiment of the tiled display device 100, a boundary line BL between the plurality of display panels 112, 114, 116 and 118 may be effectively prevented or reduced from being perceived. In such an embodiment, even when a high gray image is displayed in the edge region ER, the edge region boosting operation may be effectively performed while a luminance reduction caused by the adaptive gain AGAIN is not perceived.

Figure 11:
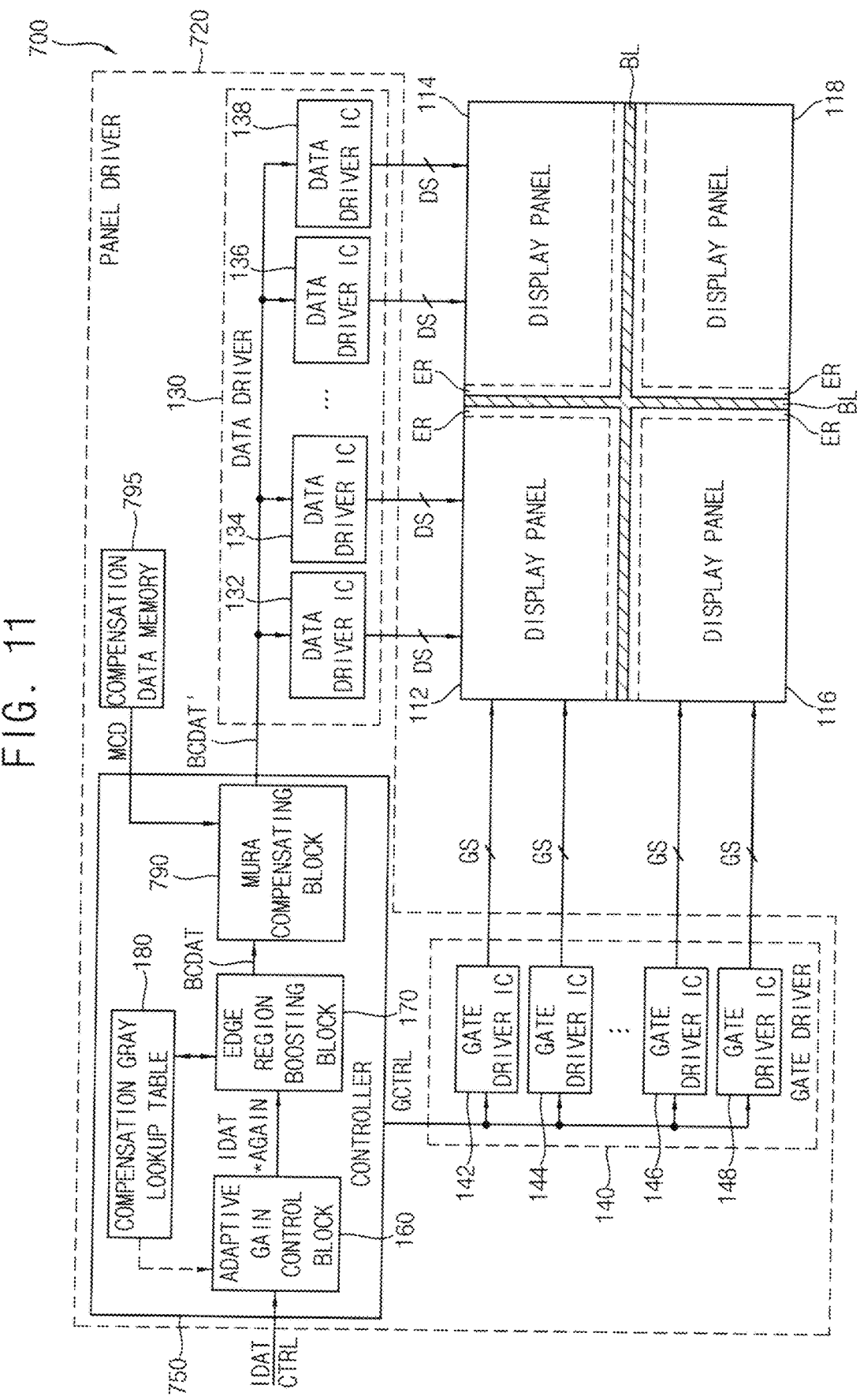
FIG. 11 is a block diagram illustrating a tiled display device according to an alternative embodiment.
Figure 12:
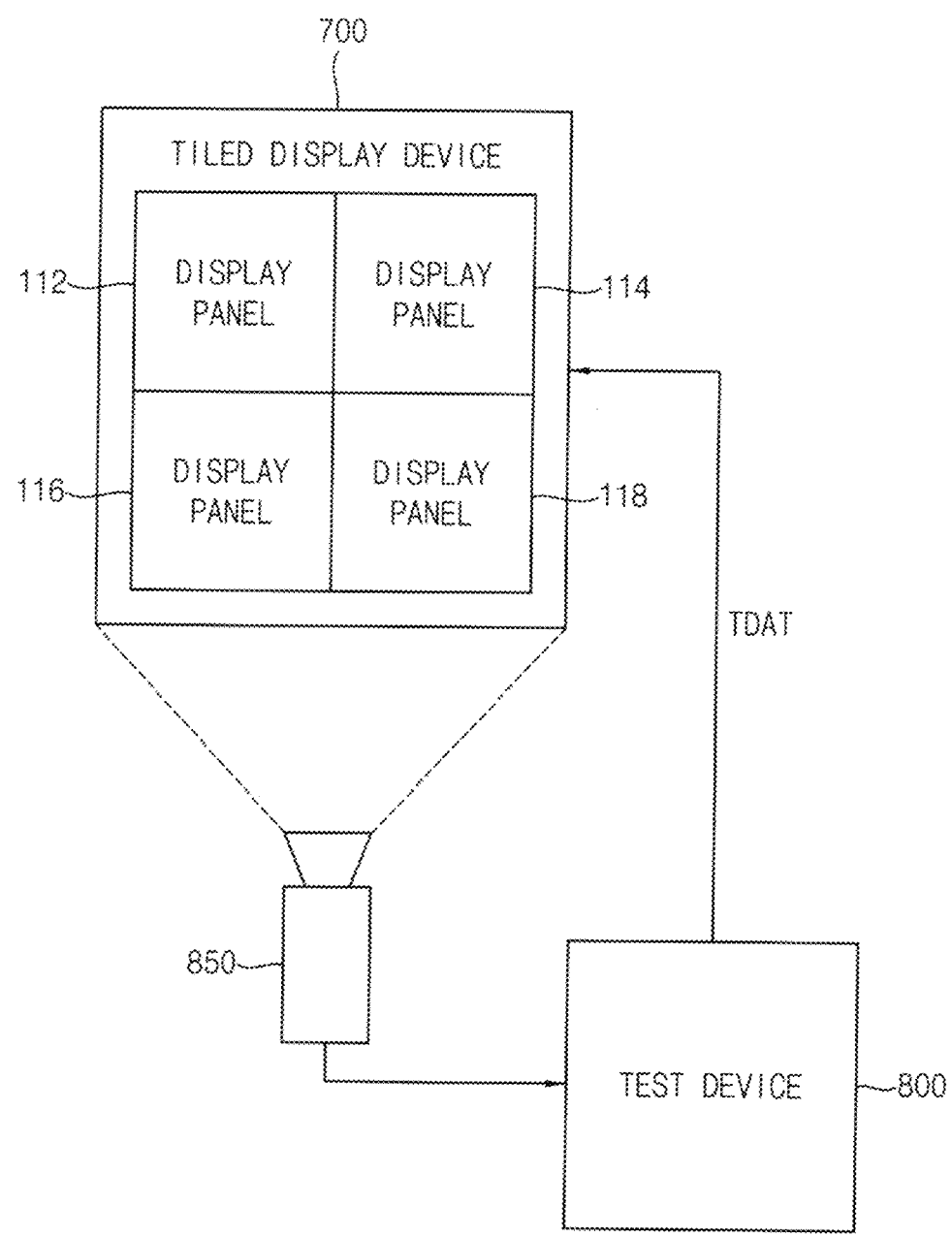
FIG. 12 is a block diagram illustrating an embodiment of a test device that generates mura compensation data for a tiled display device of FIG. 11.

FIG. 11 is a block diagram illustrating a tiled display device according to an alternative embodiment, and FIG. 12 is a block diagram illustrating an embodiment of a test device that generates mura compensation data for a tiled display device of FIG. 11.

Referring to FIG. 11, an embodiment of a tiled display device 700 according to the invention may include a plurality of display panels 112, 114, 116 and 118 and a panel driver 720. The panel driver 720 may include a data driver 130, a gate driver 140, a compensation data memory 795 and a controller 750. The controller 750 may include an adaptive gain control block 160, an edge region boosting block 170, a compensation gray lookup table 180 and a mura compensating block 790. The tiled display device 700 of FIG. 11 may have a similar configuration and a similar operation to a tiled display device 100 of FIG. 1, except that the panel driver 720 may further include the compensation data memory 795 and the mura compensating block 790. The same or like elements shown in FIG. 11 have been labeled with the same reference characters as used above to describe the embodiment of the tiled display device 100 shown in FIG. 1 and any repetitive detailed description thereof will hereinafter be omitted or simplified.

The compensation data memory 795 may store mura compensation data MCD. In an embodiment, the mura compensation data MCD of the compensation data memory 795 may be generated based on an image displayed based on image data on which an edge region boosting operation is performed when the tiled display device 700 is manufactured. In one embodiment, for example, as illustrated in FIG. 12, when the tiled display device 700 is manufactured, the panel driver 720 may receive test data TDAT from a test device 800, may perform the edge region boosting operation that adds boundary compensation gray levels to the test data TDAT for the edge region ER, and may drive the plurality of display panels 112, 114, 116 and 118 based on the test data TDAT to which the boundary compensation gray levels are added. The test device 800 may capture an image displayed by the plurality of display panels 112, 114, 116 and 118 based on the test data TDAT to which the boundary compensation gray levels are added by using a camera 850, may generate the mura compensation data MCD based on the captured image, and may write or store the mura compensation data MCD to the compensation data memory 795 of the tiled display device 700.

The mura compensating block 790 may correct boundary compensated image data BCDAT based on the mura compensation data MCD. In an embodiment, the mura compensation data MCD may represent a plurality of mura compensation values respectively for all pixels of the plurality of display panels 112, 114, 116 and 118, and the mura compensating block 790 may perform a pixel-wise mura correction operation by adding the plurality of mura compensation values to the boundary compensated image data BCDAT. The mura compensating block 790 may provide the boundary compensated image data BCDAT' corrected based on the mura compensation data MCD to the data driver 130, and the data driver 130 may drive the plurality of display panels 112, 114, 116 and 118 based on the boundary compensated image data BCDAT' corrected based on the mura compensation data MCD. Since the mura compensation data MCD are generated based on the test data TDAT on which the edge region boosting operation is performed, in an image displayed based on the boundary compensated image data BCDAT' corrected based on the mura compensation data MCD, a boundary line BL between the plurality of display panels 112, 114, 116 and 118 may be further effectively prevented or reduced from being perceived.

Figure 13:
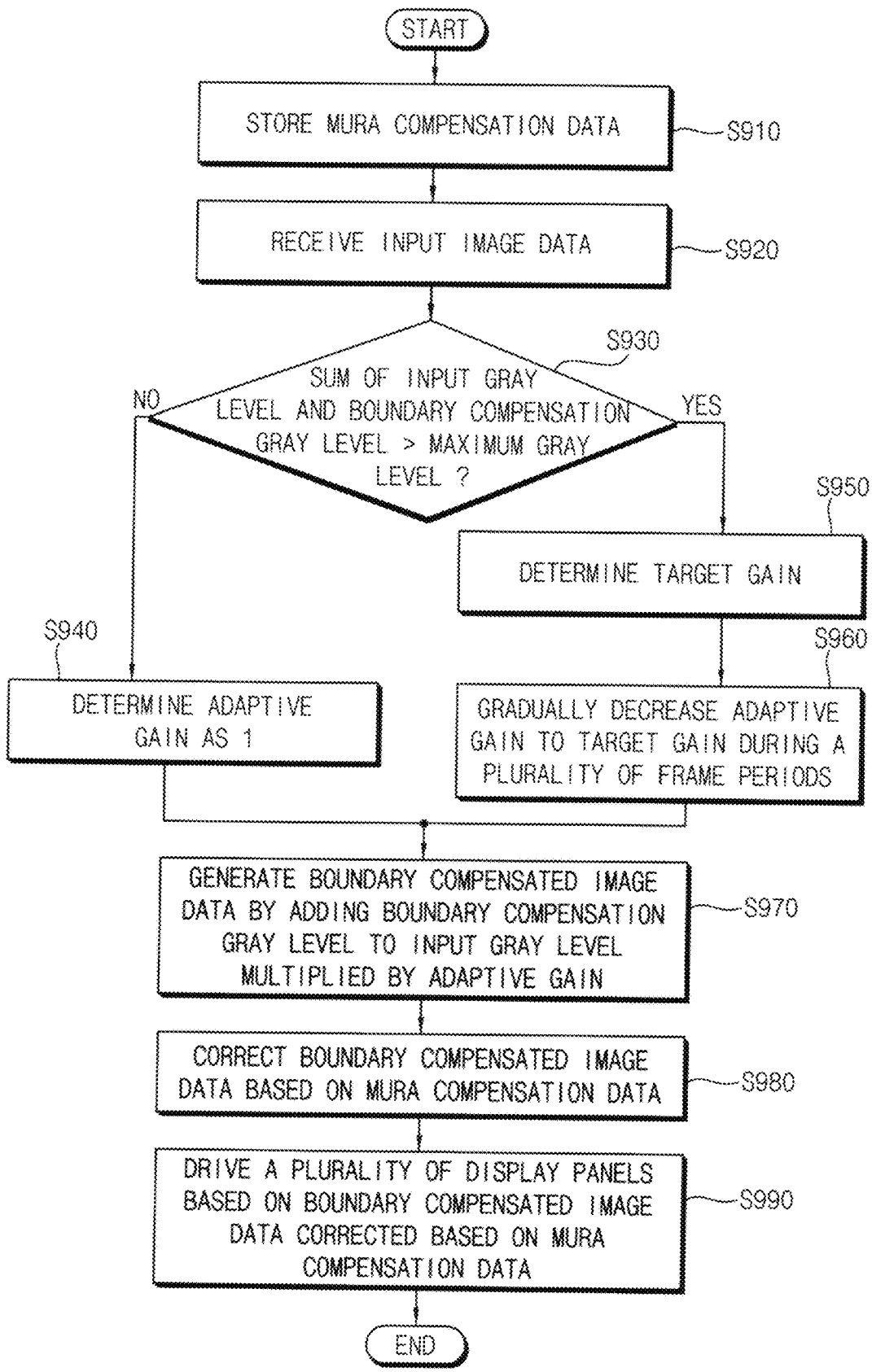
FIG. 13 is a flowchart illustrating a method of operating a tiled display device according to an embodiment.

FIG. 13 is a flowchart illustrating a method of operating a tiled display device according to an embodiment.

Referring to FIGS. 11 and 13, in an embodiment of a method of operating a tiled display device 700, a compensation data memory 795 of the tiled display device 700 may store mura compensation data MCD (S910). In an embodiment, when the tiled display device 700 is manufactured, a panel driver 720 may receive test data from a test device, may add boundary compensation gray levels to the test data for an edge region ER, and may drive a plurality of display panels 112, 114, 116 and 118 based on the test data to which the boundary compensation gray levels are added. The mura compensation data MCD may be generated by capturing an image displayed by the plurality of display panels 112, 114, 116 and 118 based on the test data to which the boundary compensation gray levels are added.

The panel driver 720 may receive input image data IDAT (S920), and an adaptive gain control block 160 of the panel driver 720 may control an adaptive gain AGAIN according to whether a sum of an input gray level of the input image data IDAT and a boundary compensation gray level exceeds a maximum gray level (S930, S940, S950 and S960).

In a case where a sum of the input gray level for the edge region ER and the boundary compensation gray level is less than or equal to the maximum gray level (S930: NO), the adaptive gain control block 160 may determine the adaptive gain AGAIN as 1 (S940).

In a case where the sum of the input gray level for the edge region ER and the boundary compensation gray level is greater than the maximum gray level (S930: YES), the adaptive gain control block 160 may determine a target gain in a way such that sums of the input gray levels multiplied by the target gain and the boundary compensation gray levels are less than or equal to the maximum gray level (S950), and may gradually decrease the adaptive gain AGAIN to the target gain over a plurality of frame periods (S960).

The adaptive gain control block 160 may multiply the input gray levels of the input image data IDAT for the plurality of display panels 112, 114, 116 and 118 by the adaptive gain AGAIN, and an edge region boosting block 170 of the panel driver 720 may generate boundary compensated image data BCDAT by performing an edge region boosting operation that adds the boundary compensation gray levels to the input gray levels of the input image data IDAT×AGAIN multiplied by the adaptive gain AGAIN for the edge region ER (S970).

A mura compensating block 790 of the panel driver 720 may correct the boundary compensated image data BCDAT based on the mura compensation data MCD stored in the compensation data memory 795 (S980). The mura compensating block 790 may provide the boundary compensated image data BCDAT' corrected based on the mura compensation data MCD to a data driver 130, and the data driver 130 may drive the plurality of display panels 112, 114, 116 and 118 based on the boundary compensated image data BCDAT' corrected based on the mura compensation data MCD (S990). Accordingly, in such an embodiment of the tiled display device 700, a boundary line BL between the plurality of display panels 112, 114, 116 and 118 may be effectively prevented or reduced from being perceived. In such an embodiment, even when a high gray image is displayed in the edge region ER, the edge region boosting operation may be effectively performed while a luminance reduction caused by the adaptive gain AGAIN is not perceived.

Figure 14:
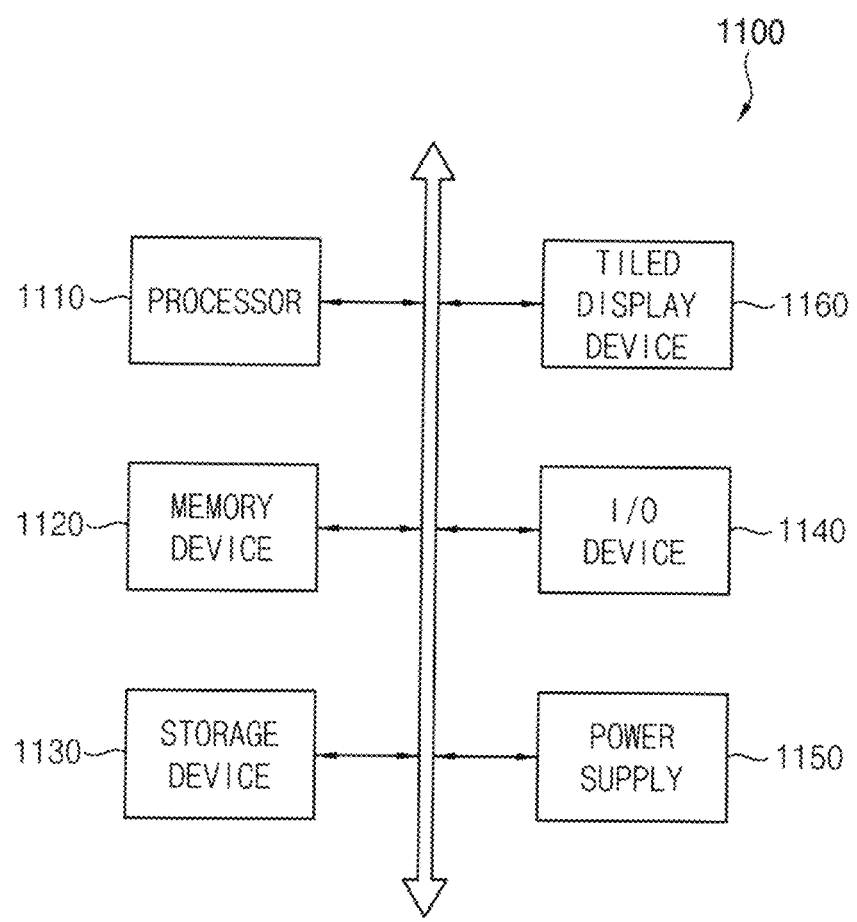
FIG. 14 is a block diagram illustrating an electronic device including a tiled display device according to an embodiment.

FIG. 14 is a block diagram illustrating an electronic device including a tiled display device according to an embodiment.

Referring to FIG. 14, an embodiment of an electronic device 1100 may include a processor 1110, a memory device 1120, a storage device 1130, an input/output ("I/O") device 1140, a power supply 1150, and a tiled display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an AP, a micro-processor, a central processing unit ("CPU"), etc. The processor 1110 may be coupled to other components via an address bus, a control bus, a data bus, etc. Further, in an embodiment, the processor 1110 may be further coupled to an extended bus such as a peripheral component interconnection ("PCI") bus.

The memory device 1120 may store data for operations of the electronic device 1100. In one embodiment, for example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc.

The storage device 1130 may be a solid state drive ("SSD") device, a hard disk drive ("HDD") device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The tiled display device 1160 may be coupled to other components through the buses or other communication links.

In such an embodiment, the tiled display device 1160 may multiply input gray levels of input image data for a plurality of display panels coupled to each other by an adaptive gain, may generate boundary compensated image data by adding boundary compensation gray levels to the input gray levels (multiplied by the adaptive gain) for an edge region adjacent to a boundary line between the plurality of display panels, and may drive the plurality of display panels based on the boundary compensated image data. In such an embodiment, the adaptive gain may be gradually decreased over a plurality of frame periods in a case where a sum of each of the input gray levels for the edge region and a corresponding one of the boundary compensation gray levels exceeds a maximum gray level. Accordingly, in such an embodiment of the tiled display device 1160, the boundary line between the plurality of display panels may be effectively prevented or reduced from being perceived.

Embodiments of the invention described herein may be applied to any tiled display device 1160, and any electronic device 1100 including the tiled display device 1160, for example, a smart phone, a wearable electronic device, a tablet computer, a mobile phone, a television ("TV"), a digital TV, a 3D TV, a personal computer ("PC"), a home appliance, a laptop computer, a personal digital assistant ("PDA"), a portable multimedia player ("PMP"), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A tiled display device comprising:
   a plurality of display panels coupled to each other,
   wherein each of the plurality of display panels includes an edge region adjacent to a boundary line between the plurality of display panels; and a panel driver which multiplies input gray levels of input image data for the plurality of display panels by an adaptive gain, generates boundary compensated image data by adding boundary compensation gray levels to the input gray levels multiplied by the adaptive gain for the edge region, and drives the plurality of display panels based on the boundary compensated image data, wherein the adaptive gain is gradually decreased over a plurality of frame periods in a case where a sum of each of the input gray levels for the edge region and a corresponding one of the boundary compensation gray levels exceeds a maximum gray level.

2. The tiled display device of claim 1, wherein the adaptive gain has a value greater than 0 and less than or equal to 1.

3. The tiled display device of claim 1, wherein the adaptive gain has a single value with respect to an entire region of the plurality of display panels.

4. The tiled display device of claim 1, wherein the adaptive gain after the plurality of frame periods is gradually decreased along a direction from a center region of each of the plurality of display panels to the edge region.

5. The tiled display device of claim 1, wherein the adaptive gain with respect to a center region of each of the plurality of display panels is decreased by a first amount over the plurality of frame periods, and the adaptive gain with respect to the edge region of each of the plurality of display panels is decreased by a second amount greater than the first amount over the plurality of frame periods.

6. The tiled display device of claim 1, wherein the panel driver includes:
an adaptive gain control block which multiplies the input gray levels for the plurality of display panels by the adaptive gain; and
an edge region boosting block which generates the boundary compensated image data by adding the boundary compensation gray levels to the input gray levels multiplied by the adaptive gain for the edge region.

7. The tiled display device of claim 6,
wherein, in a case where the sum of each of the input gray levels for the edge region and the corresponding one of the boundary compensation gray levels is less than or equal to the maximum gray level, the adaptive gain control block determines the adaptive gain as 1, and
wherein, in a case where the sum of each of the input gray levels for the edge region and the corresponding one of the boundary compensation gray levels is greater than the maximum gray level, the adaptive gain control block determines a target gain in a way such that sums of the input gray levels multiplied by the target gain and the boundary compensation gray levels are less than or equal to the maximum gray level, and gradually decreases the adaptive gain to the target gain over the plurality of frame periods.

8. The tiled display device of claim 6,
wherein the adaptive gain control block counts a number of pixels in the edge region for which the sum of the input gray level and the boundary compensation gray level exceeds the maximum gray level,
wherein, in a case where the counted number is less than a reference number, the adaptive gain control block determines the adaptive gain as 1, and
wherein, in a case where the counted number is greater than or equal to the reference number, the adaptive gain control block determines a target gain in a way such that sums of the input gray levels multiplied by the target gain and the boundary compensation gray levels are less than or equal to the maximum gray level, and gradually decreases the adaptive gain to the target gain over the plurality of frame periods.

9. The tiled display device of claim 6,
wherein the adaptive gain control block counts a number of pixels in the edge region for which the sum of the input gray level and the boundary compensation gray level exceeds the maximum gray level, and calculates a ratio of the counted number to a total pixel number in the edge region,
wherein, in a case where the calculated ratio is less than a reference ratio, the adaptive gain control block determines the adaptive gain as 1, and
wherein, in a case where the calculated ratio is greater than or equal to the reference ratio, the adaptive gain control block determines a target gain in a way such that sums of the input gray levels multiplied by the target gain and the boundary compensation gray levels are less than or equal to the maximum gray level, and gradually decreases the adaptive gain to the target gain over the plurality of frame periods.

10. The tiled display device of claim 6,
wherein the adaptive gain control block determines sums of the input gray levels for the edge region and the boundary compensation gray levels exceeding the maximum gray level, and calculates differences between the sums exceeding the maximum gray level and the maximum gray level,
wherein, in a case where a sum of the differences is less than a reference value, the adaptive gain control block determines the adaptive gain as 1, and
wherein, in a case where the sum of the differences is greater than or equal to the reference value, the adaptive gain control block determines a target gain in a way such that sums of the input gray levels multiplied by the target gain and the boundary compensation gray levels are less than or equal to the maximum gray level, and gradually decreases the adaptive gain to the target gain over the plurality of frame periods.

11. The tiled display device of claim 6, wherein the panel driver further includes:
a compensation gray lookup table which stores the boundary compensation gray levels corresponding to respective gray levels, and
wherein the edge region boosting block determines the boundary compensation gray levels corresponding to the input gray levels multiplied by the adaptive gain by using the compensation gray lookup table, and generates the boundary compensated image data by adding the boundary compensation gray levels to the input gray levels multiplied by the adaptive gain for the edge region.

12. The tiled display device of claim 6, wherein the panel driver further includes:
a compensation data memory which stores mura compensation data; and
a mura compensating block which corrects the boundary compensated image data based on the mura compensation data.

13. The tiled display device of claim 12,
wherein the panel driver receives test data from a test device, adds the boundary compensation gray levels to the test data for the edge region, and drives the plurality of display panels based on the test data to which the boundary compensation gray levels are added, and
wherein the mura compensation data are generated by capturing an image displayed by the plurality of display panels based on the test data to which the boundary compensation gray levels are added.

14. A tiled display device comprising:

a plurality of display panels coupled to each other, wherein each of the plurality of display panels includes an edge region adjacent to a boundary line between the plurality of display panels;

a data driver which provides data signals to the plurality of display panels;

a gate driver which provides gate signals to the plurality of display panels; and a controller which controls the data driver and the gate driver, wherein the controller includes:

an adaptive gain control block which multiplies input gray levels of input image data for the plurality of display panels by an adaptive gain; and an edge region boosting block which generates boundary compensated image data by adding boundary compensation gray levels to the input gray levels multiplied by the adaptive gain for the edge region, and provides the boundary compensated image data to the data driver, wherein the adaptive gain is gradually decreased over a plurality of frame periods in a case where a sum of each of the input gray levels for the edge region and a corresponding one of the boundary compensation gray levels exceeds a maximum gray level.

15. The tiled display device of claim 14, wherein the adaptive gain has a single value with respect to an entire region of the plurality of display panels.

16. The tiled display device of claim 14, wherein the adaptive gain after the plurality of frame periods is gradually decreased along a direction from a center region of each of the plurality of display panels to the edge region.

17. The tiled display device of claim 14, wherein the adaptive gain with respect to a center region of each of the plurality of display panels is decreased by a first amount over the plurality of frame periods, and the adaptive gain with respect to the edge region of each of the plurality of display panels is decreased by a second amount greater than the first amount over the plurality of frame periods.

18. The tiled display device of claim 14, wherein the controller further includes:

a compensation gray lookup table which stores the boundary compensation gray levels corresponding to respective gray levels, and wherein the edge region boosting block determines the boundary compensation gray levels corresponding to the input gray levels multiplied by the adaptive gain by using the compensation gray lookup table, and generates the boundary compensated image data by adding the boundary compensation gray levels to the input gray levels multiplied by the adaptive gain for the edge region.

19. A tiled display device comprising:

a plurality of display panels coupled to each other, wherein each of the plurality of display panels includes an edge region adjacent to a boundary line between the plurality of display panels;

a data driver which provides data signals to the plurality of display panels;

a gate driver which provides gate signals to the plurality of display panels;

a compensation data memory which stores mura compensation data; and a controller which controls the data driver and the gate driver, wherein the controller includes:

an adaptive gain control block which multiplies input gray levels of input image data for the plurality of display panels by an adaptive gain;

an edge region boosting block which generates boundary compensated image data by adding boundary compensation gray levels to the input gray levels multiplied by the adaptive gain for the edge region; and a mura compensating block which corrects the boundary compensated image data based on the mura compensation data, and provides the boundary compensated image data corrected based on the mura compensation data to the data driver, wherein the adaptive gain is gradually decreased over a plurality of frame periods in a case where a sum of each of the input gray levels for the edge region and a corresponding one of the boundary compensation gray levels exceeds a maximum gray level.

20. The tiled display device of claim 19, wherein the controller receives test data from a test device, and adds the boundary compensation gray levels to the test data for the edge region, and wherein the mura compensation data are generated by capturing an image displayed by the plurality of display panels based on the test data to which the boundary compensation gray levels are added.

* * * * *